(12) United States Patent
Kora et al.

(10) Patent No.: US 7,111,894 B2
(45) Date of Patent: Sep. 26, 2006

(54) AUTOMOBILE DOOR STRUCTURE

(75) Inventors: Fumihiro Kora, Aki-gun (JP); Norifumi Inoue, Aki-gun (JP); Haruki Ota, Aki-gun (JP); Takahiro Tochioka, Aki-gun (JP); Ikuo Nishikawa, Hiroshima (JP); Shinji Gasami, Higashihiroshima (JP)

(73) Assignees: Mazda Motor Corporation, Hiroshima (JP); Hirotec Corporation, Hiroshima (JP); GP Daikyo Corporation, Hiroshima (JP)

( * ) Notice: Subject to any disclaimer, the term of this patent is extended or adjusted under 35 U.S.C. 154(b) by 42 days.

(21) Appl. No.: 10/852,676

(22) Filed: May 25, 2004

(65) Prior Publication Data

US 2005/0052050 A1 Mar. 10, 2005

(30) Foreign Application Priority Data

Jun. 13, 2003 (JP) .............................. 2003-169430
Jun. 13, 2003 (JP) .............................. 2003-169431
Jun. 18, 2003 (JP) .............................. 2003-173580

(51) Int. Cl.
*B60J 5/04* (2006.01)

(52) U.S. Cl. ................................ 296/146.1

(58) Field of Classification Search ............ 296/146.1, 296/146.7, 146.6, 146.5, 146.2, 39.1, 152–154; 49/501–502
See application file for complete search history.

(56) References Cited

U.S. PATENT DOCUMENTS

| | | | | |
|---|---|---|---|---|
| 5,111,619 | A * | 5/1992 | Billin et al. ................. | 49/502 |
| 5,584,144 | A * | 12/1996 | Hisano ........................ | 49/502 |
| 6,139,088 | A * | 10/2000 | Okamoto et al. ......... | 296/146.6 |
| 6,196,606 | B1 * | 3/2001 | McGoldrick ............. | 296/37.13 |
| 6,381,906 | B1 * | 5/2002 | Pacella et al. ............. | 49/502 |
| 6,412,852 | B1 * | 7/2002 | Koa et al. ................. | 296/146.7 |
| 6,615,546 | B1 * | 9/2003 | Furuyama et al. ........ | 49/502 |
| 6,616,216 | B1 * | 9/2003 | Furuyama et al. ....... | 296/146.7 |
| 6,698,140 | B1 * | 3/2004 | Tatsumi et al. ........... | 49/502 |
| 2003/0116993 | A1 * | 6/2003 | Skarb et al. ............. | 296/146.7 |

FOREIGN PATENT DOCUMENTS

| | | |
|---|---|---|
| JP | 11-348556 | 12/1999 |
| JP | 2000-296717 | 10/2000 |
| JP | 2000-318532 | 11/2000 |

* cited by examiner

*Primary Examiner*—H Gutman

(57) ABSTRACT

An automobile door structure of this invention is formed by joining an outer panel and inner panel to each other. The inner panel has an opening portion. A resin-made carrier plate which supports accessories of a door is attached to the inner panel so as to cover the opening portion. An upper trim portion extending to cover a vehicle compartment side of a belt portion of the door is integrally molded on an upper portion of the carrier plate. A trim plate is attached to a portion of the carrier plate which is below the upper trim portion so as to cover the vehicle compartment side of the carrier plate.

10 Claims, 39 Drawing Sheets

# AUTOMOBILE DOOR STRUCTURE

FIELD OF THE INVENTION

The present invention relates to an automobile door structure formed by joining an outer panel and inner panel to each other.

BACKGROUND OF THE INVENTION

In general, an automobile door is formed by joining a door outer panel and door inner panel to each other. An opening portion is formed in the door inner panel. The opening portion is covered by a carrier plate which supports accessories (door function components).

More specifically, as shown in FIGS. 38 and 39, an opening portion 82 of an inner panel 81 is covered by a resin-made carrier plate 83. The vehicle compartment side of the carrier plate 83 is covered by a trim plate 84 to improve the design.

Conventionally, the trim plate 84 described above is integrally formed with an upper trim portion 84a which covers a belt portion 81b of the inner panel 81, a trim main body portion 84c integrally molded with an armrest portion 84b, and a pocket portion 84d which forms a door pocket, that are connected to each other. A wood board 85 is disposed on the rear surface side of the upper trim portion 84a. A cloth portion 86 (so-called fabric portion) is formed on the vehicle compartment side between the lower end of the upper trim portion 84a and the upper end of the armrest portion 84b in order to ensure good design.

More specifically, the conventional trim plate 84 has a so-called full-trim structure that largely covers from the upper end of the belt portion 81b of the inner panel 81 to the lower end of the carrier plate 83 entirely. Since an expensive decorative laminated sheet is used to form the trim plate 84, cost reduction suffers. Also, the trim plate 84 itself is comparatively large, and it accordingly has poor moldability.

Japanese Patent Laid-Open No. 2000-318532 proposes a door module structure in which a door inner panel is made of a synthetic resin or light alloy and a carrier plate is integrally formed with the door inner panel.

In the door module structure disclosed in this prior art reference, a trim plate has a so-called full-trim structure that largely covers from the upper end of the belt portion of the inner panel to the lower end of the carrier plate entirely. Thus, this structure has the same problems as those of the prior art shown in FIGS. 38 and 39.

As described above, accessories such as a loudspeaker and window regulator are attached to and supported by the carrier plate. If a regulator rail for the window regulator is built on the carrier plate in advance before the carrier plate is attached to the open edge of the opening portion of the inner panel, the carrier plate is built by inserting the window regulator rail into the inner space of the door through the opening portion of the inner panel. The gap in the vehicle widthwise direction between the upper end of the window regulator rail and the upper end of the carrier plate is very small. In building up the carrier plate by insertion, the upper end of the window regulator rail interferes with the open edge of the opening portion of the inner panel. Thus, it is difficult to ensure smooth build-up performance.

Japanese Patent Laid-Open No. 11-348556 discloses the following structure for the purpose of simplifying assembly of an automobile door. An insertion hole is formed in the lower portion of a door main body formed by bonding an outer panel and inner panel. A window glass panel is supported by a base including a wall portion and lid portion through an elevating means. The resultant window glass panel structure is inserted in the insertion hole from below, and is built in the door main body.

The window regulator disclosed in this prior art reference is a so-called X-arm window regulator. This is different from a structure of a type in which a vertically extending window regulator rail is built on a carrier plate in advance and the carrier plate is attached to the opening portion of a door inner panel.

Japanese Patent Laid-Open No. 2000-296717 discloses the following structure. In an automobile door formed by clamping an inner panel with an outer panel and trim plate, the inner panel is integrally formed with a deep-drawn projecting portion that fills a space surrounded by the outer panel and trim plate. The inner panel is integrally formed with a wire guide projecting portion which guides a wire for a wire-type window regulator, a glass panel guide projecting portion which guides a window glass panel that moves vertically, and a base projecting portion to which door function components such as a window regulator, door lock, and loudspeaker are to be mounted. The automobile door disclosed in this prior art reference does not use a carrier plate.

In this manner, none of the prior art references is aimed at smooth building-up of a carrier plate when a window regulator rail is built on the carrier plate in advance and the carrier plate is attached to the opening portion of a door inner panel.

SUMMARY OF THE INVENTION

It is the first object of the present invention to provide an automobile door structure in which an expensive trim plate is downsized to decrease the cost, and since the trim plate is downsized, it can be molded easily, attached easily, and handled easily.

In order to achieve the first object, in an automobile door structure according to the present invention, an upper trim portion extending to cover a vehicle compartment side of a belt portion of an inner panel is integrally molded on an upper portion of a carrier plate, and a trim plate is attached to a portion of the carrier plate which is below the upper trim portion so as to cover the vehicle compartment side of the carrier plate.

The carrier plate with the above arrangement is preferably made of FRP (Fiber-Reinforced Plastic) because it needs rigidity. The trim plate can be formed of a decorative laminated sheet.

With this arrangement, since the upper trim portion is integrally formed on the carrier plate, the rigidity becomes larger than in a case wherein the upper trim portion is integrally formed on the trim plate. A wood board as a reinforcing member for the upper trim portion can be omitted, thus achieving cost reduction.

As the trim plate is downsized, it can be molded easily, attached easily, and handled easily.

Since the upper trim portion is integrally molded on the carrier plate, the weight of the carrier plate increases by the weight of the upper trim portion. The carrier plate is originally heavy as auxiliary members such as a window regulator are attached to it. Thus, the carrier plate can be attached without degrading operability.

It is the second object of the present invention to build a carrier plate on a door inner panel smoothly when a window regulator rail is built on the carrier plate in advance and the carrier plate is to be attached to the opening portion of the door inner panel.

In order to achieve the second object, in an automobile door structure according to the present invention, a resin-made carrier plate is disposed closer to an outer panel than an inner panel and is built with a window regulator rail in advance which allows vertical movement of a window glass panel, the window regulator rail is temporarily fixed to the carrier plate at a temporary fixing position separate from a regular attaching position, the carrier plate is attached to an opening portion of the inner panel such that a belt portion of the inner panel is positioned between an upper portion of the carrier plate and an upper portion of the window regulator rail, and thereafter the window regulator rail is attached to the regular attaching position, and while the carrier plate is attached to the opening portion, an upper end of the carrier plate and an upper end of the window regulator rail are located above a lower end of the belt portion.

With this arrangement, the window regulator rail is built on the carrier plate in advance. The window regulator rail is temporarily fixed to the carrier plate to be separate from the regular attaching position. During temporary fixing, the gap in the vehicle widthwise direction between the upper end of the window regulator rail and the upper end of the carrier plate is set large.

The carrier plate is attached to the opening portion such that the belt portion of the inner panel is positioned between the upper portion of the carrier plate and the upper portion of the window regulator rail. After that, the window regulator rail is shifted from the temporary fixing position and attached to the regular attaching position.

Consequently, if the structure of the inner panel is not changed, during building-up, the upper portion of the window regulator rail or/and the upper portion of the carrier plate do not interfere with the belt portion located at the upper edge of the opening portion of the inner panel. Thus, smooth build-up performance can be ensured, and the degree of freedom in designing the carrier plate can be increased.

As the upper end of the carrier plate and the upper end of the window regulator rail are located above the lower end of the belt portion, the build-up performance may be degraded normally. However, since the window regulator rail is shifted from the temporary fixing position described above to the regular attaching position, good build-up performance can be ensured.

In order to achieve the second object, in an automobile door structure according to the present invention, an inner panel includes an inner panel front side portion which forms a front side of the inner panel and is connected to a vehicle body through a hinge, and an inner panel rear side portion which forms a rear side of the inner panel, a carrier plate can be attached between the inner panel front side portion and inner panel rear side portion, the carrier plate is integrally formed with a belt portion which extends between the inner panel front side portion and inner panel rear side portion, and a window regulator rail which is disposed closer to the outer panel than the inner panel and allows vertical movement of the window glass panel is built on the carrier plate in advance.

With this arrangement, when the window regulator rail is built on the carrier plate in advance, since the carrier plate is integrally formed with the belt portion which extends substantially at the height of the belt line between the inner panel front side portion and inner panel rear side portion, when building the carrier plate to the door, the window regulator rail and the like built on the carrier plate in advance will not interfere with the belt portion of the inner panel at all. Thus, the build-up performance can be improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

The first embodiment of the present invention will be described in detail with reference to the accompanying drawings.

Figure 1:
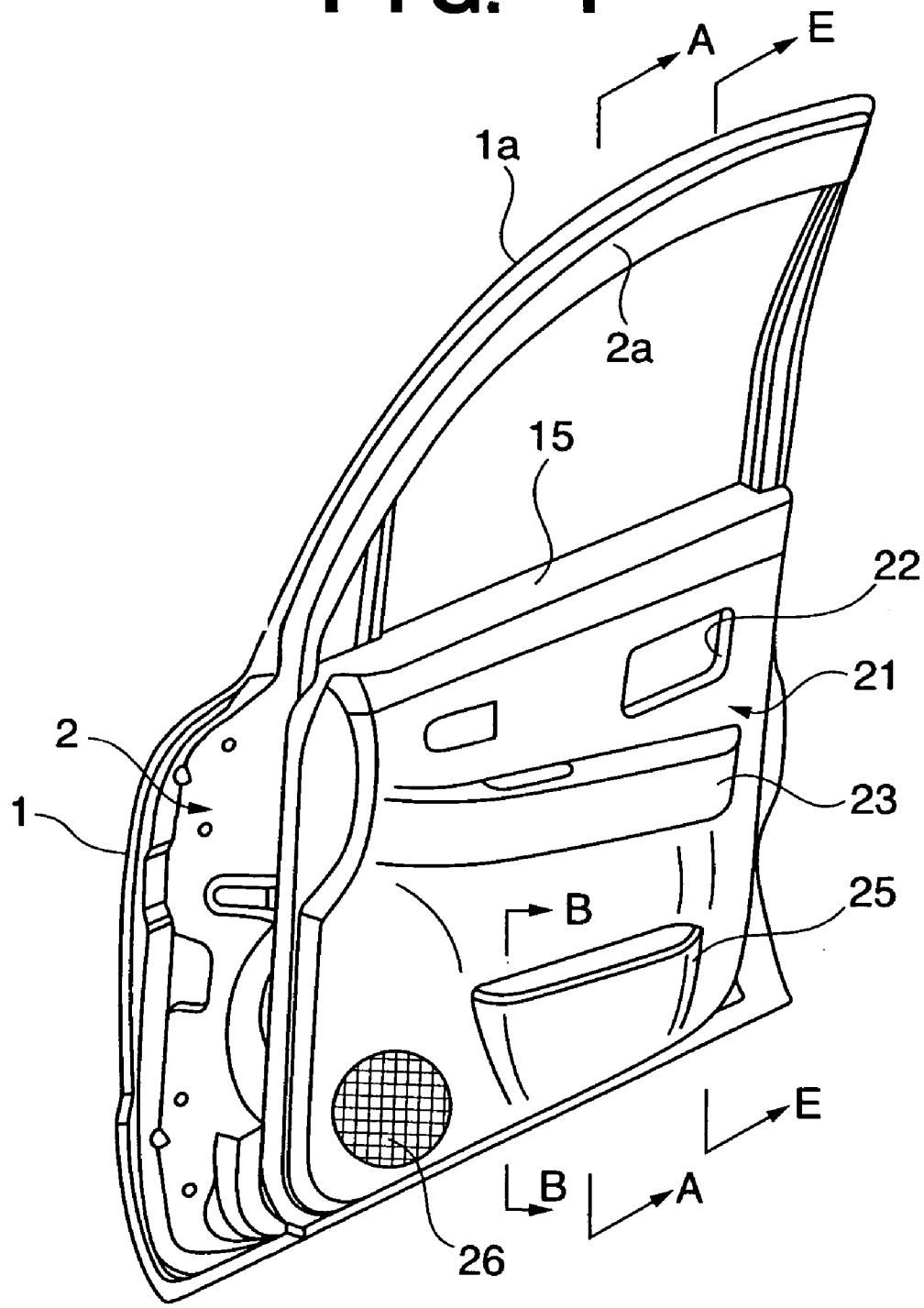
FIG. 1 is a perspective view showing an automobile door structure according to the first embodiment of the present invention.
Figure 2:
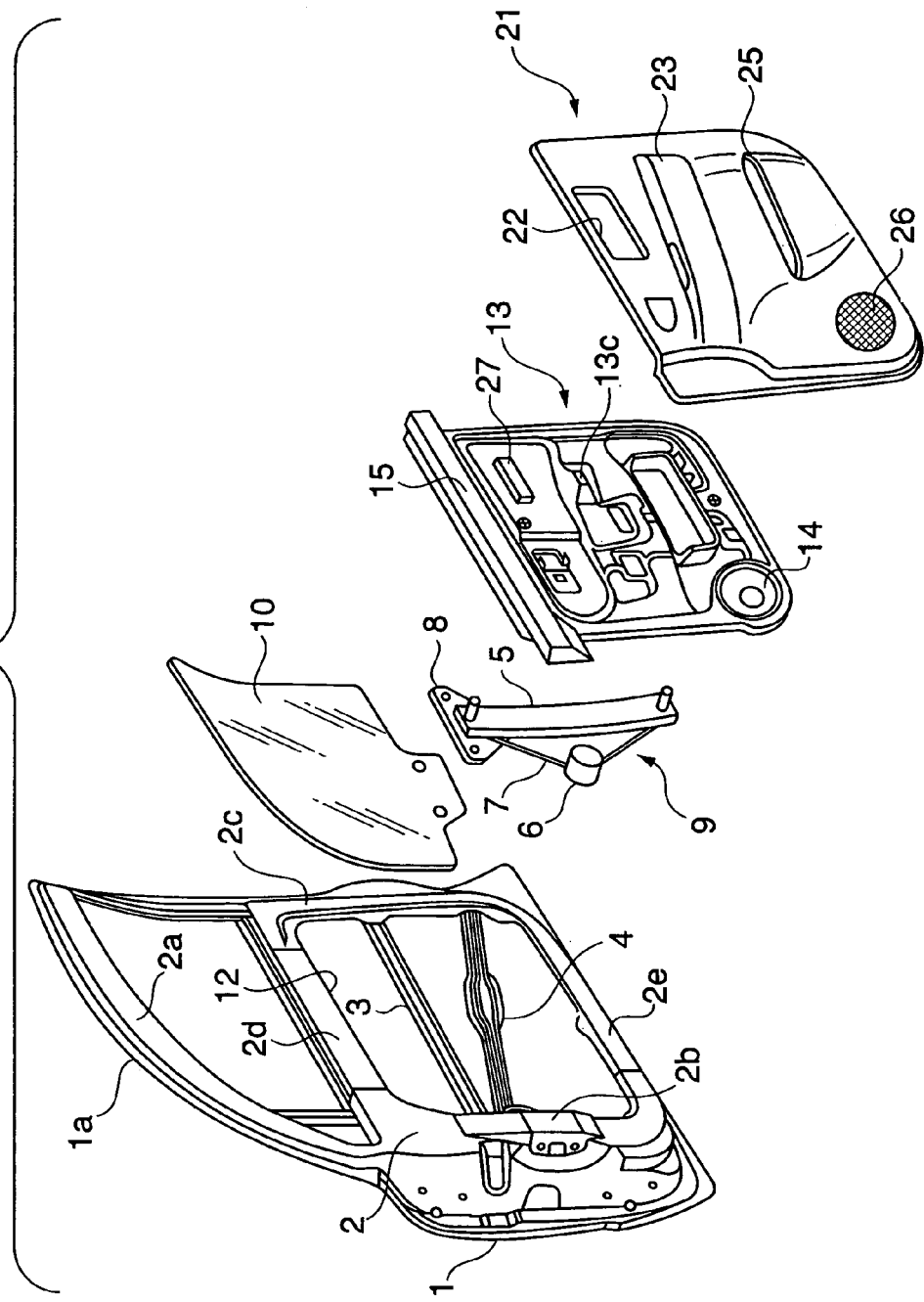
FIG. 2 is an exploded perspective view of FIG. 1.
Figure 3:
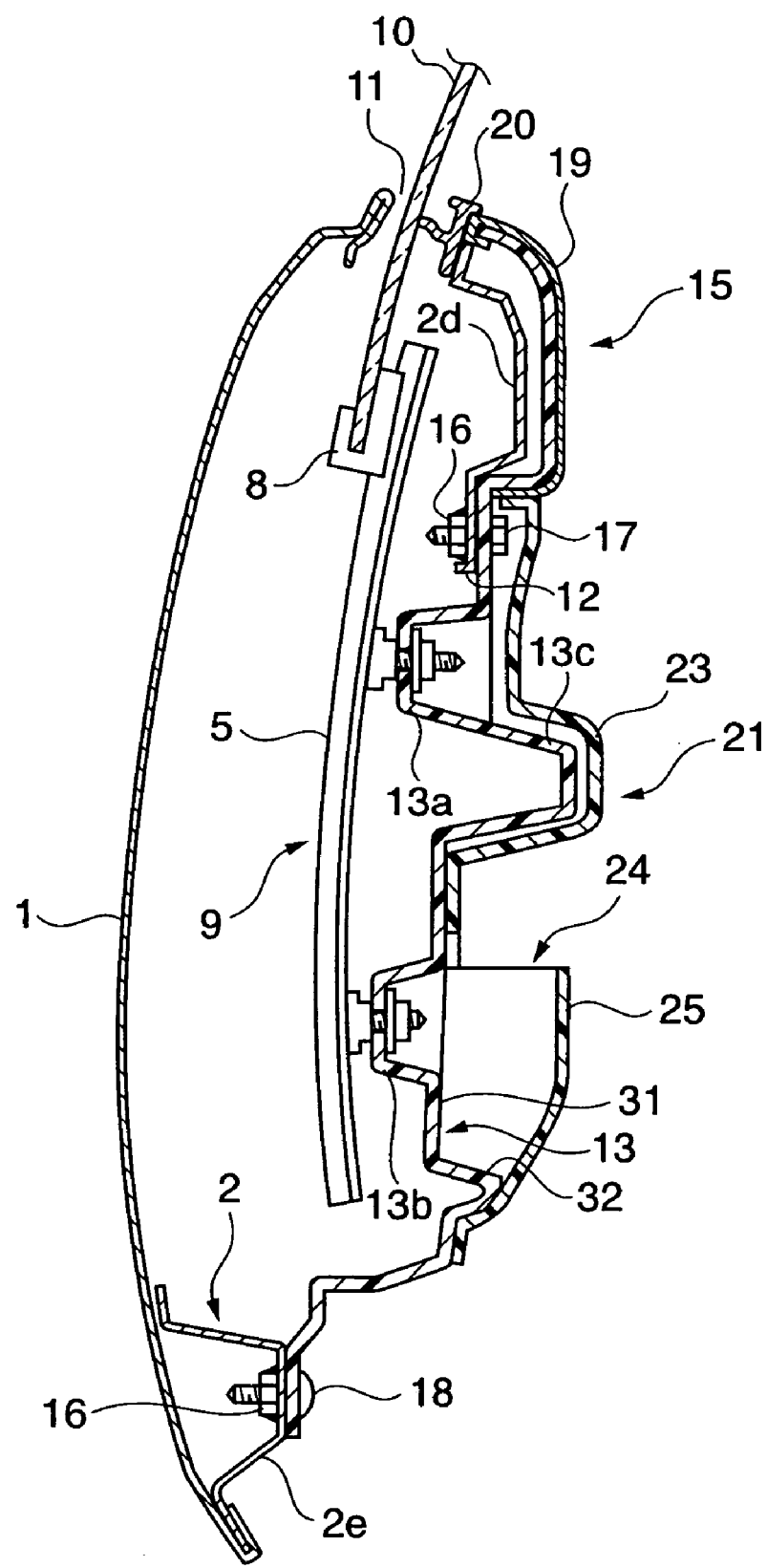
FIG. 3 is an enlarged sectional view of the main part taken along the line A—A of FIG. 1.
Figure 4:
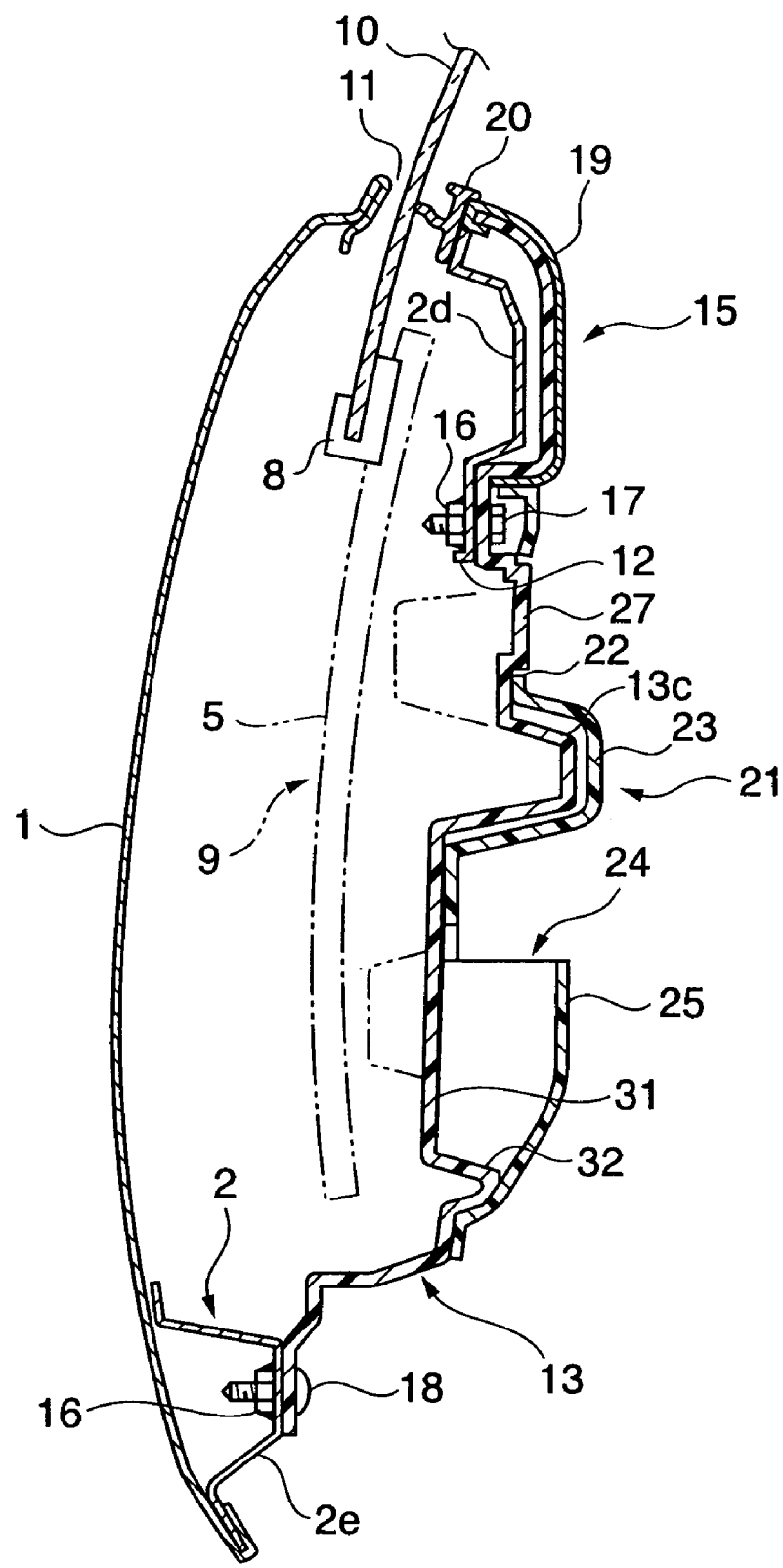
FIG. 4 is an enlarged sectional view of the main part taken along the line E—E of FIG. 1.

FIG. 1 is a perspective view showing an automobile door structure according to this embodiment, FIG. 2 is an exploded perspective view of the same, FIG. 3 is a sectional view of the main part taken along the line A—A of FIG. 1, and FIG. 4 is a sectional view of the main part taken along the line E—E of FIG. 1. Referring to FIGS. 1 to 4, the automobile door structure is formed by joining an outer panel 1 and inner panel 2 to each other.

The outer panel 1 and inner panel 2 include door main body portions and sash portions 1a and 2a, respectively. Although this embodiment exemplifies a front door having the sash portions 1a and 2a, the automobile door structure of this embodiment can also be applied to a sash-less front door or rear door.

As shown in FIG. 2, impact bars 3 and 4 extend through the space in the door in the back-and-forth direction of the vehicle, to ensure rigidity against side collision. More specifically, the upper and lower impact bars 3 and 4 are joined and fixed to predetermined portions of the inner panel 2.

As shown in FIGS. 2 and 3, a window regulator 9 including a regulator rail 5, motor 6, wire 7, and slider 8 is disposed in the space in the door. The slider 8 of the window regulator 9 vertically moves a window glass panel 10.

The window glass panel 10 is moved in the vertical direction through an opening 11 for vertical movement of the window glass panel which is formed in the upper end of the door main body portion. A weather strip or draining inner seal is attached to the upper end portion of the outer panel 1 corresponding to the opening 11.

The inner panel 2 is formed of a metal plate such as a steel plate, and an opening portion 12 is formed in the door main body portion of the inner panel 2 to leave a front side portion 2b, rear side portion 2c, belt portion 2d (upper side portion), and lower side portion 2e.

A resin-made carrier plate 13 is arranged to cover the opening portion 12 of the inner panel 2. The carrier plate 13 is made of a resin such as FRP (Fiber-Reinforced Plastic), and supports the window regulator 9 and a loudspeaker 14 as the accessories (door function components) of the door.

As shown in FIG. 3, the carrier plate 13 is integrally molded with window regulator attaching portions 13a and 13b and armrest support portion 13c simultaneously.

In addition, an upper trim portion 15 extending to cover the vehicle compartment side of the belt portion 2d of the inner panel 2 is integrally molded (simultaneous molding) on the upper portion of the carrier plate 13 from the same material such as FRP.

The carrier plate 13 is attached to the inner panel 2 so as to cover the opening portion 12. As shown in FIG. 3, nuts 16 are welded and fixed to the inner panel 2 to correspond to the periphery of the opening portion 12 in advance. The carrier plate 13 is attached and fixed to the periphery of the opening portion 12 by using attaching members such as bolts 17 and machine screws 18.

The carrier plate 13 is colored with arbitrary hue. A trim skin 19 is molded on the upper trim portion 15 on the carrier plate 13 simultaneously. As the material to form the trim skin 19, PVC (PolyVinyl Chloride) or the like can be used.

A draining inner seal 20 (draining inner member) which drains water attaching to the window glass panel 10 is integrally formed on the upper end portion of the upper trim portion 15 which opposes the window glass panel 10.

As shown in FIG. 3, a trim plate 21 is attached to that portion of the carrier plate 13 which is below the upper trim portion 15, to cover the vehicle compartment side of the carrier plate 13.

Figure 5:
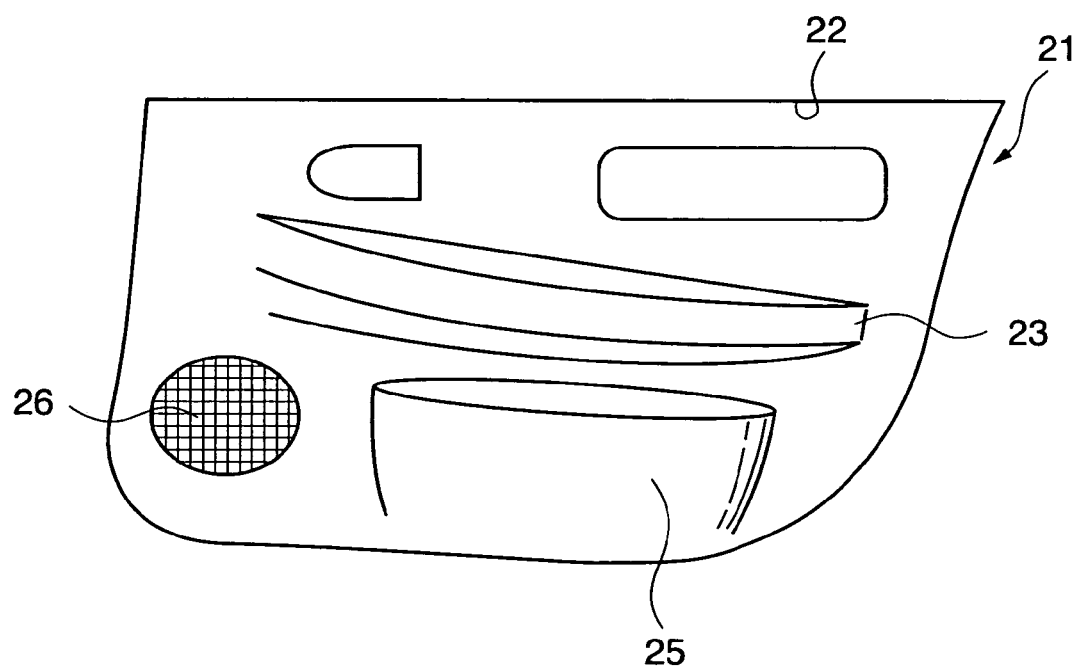
FIG. 5 is a side view of a trim plate.

The trim plate 21 is formed of a decorative laminated sheet. As shown in FIGS. 2, 4, and 5, the trim plate 21 is integrally, simultaneously molded with an opening 22 in its upper portion, armrest portion 23 at its intermediate portion in the vertical direction, pocket front surface portion 25 at its lower portion to form a pocket portion 24, and loudspeaker grille 26 at its lower front portion.

Since the opening 22 is formed in the trim plate 21, an exposed portion 27 (both the exposed portion 27 and upper trim portion 15 are exposed portions) which is not covered by the trim plate 21 is formed in the carrier plate 13, as shown in FIGS. 3 and 5.

Figure 6:
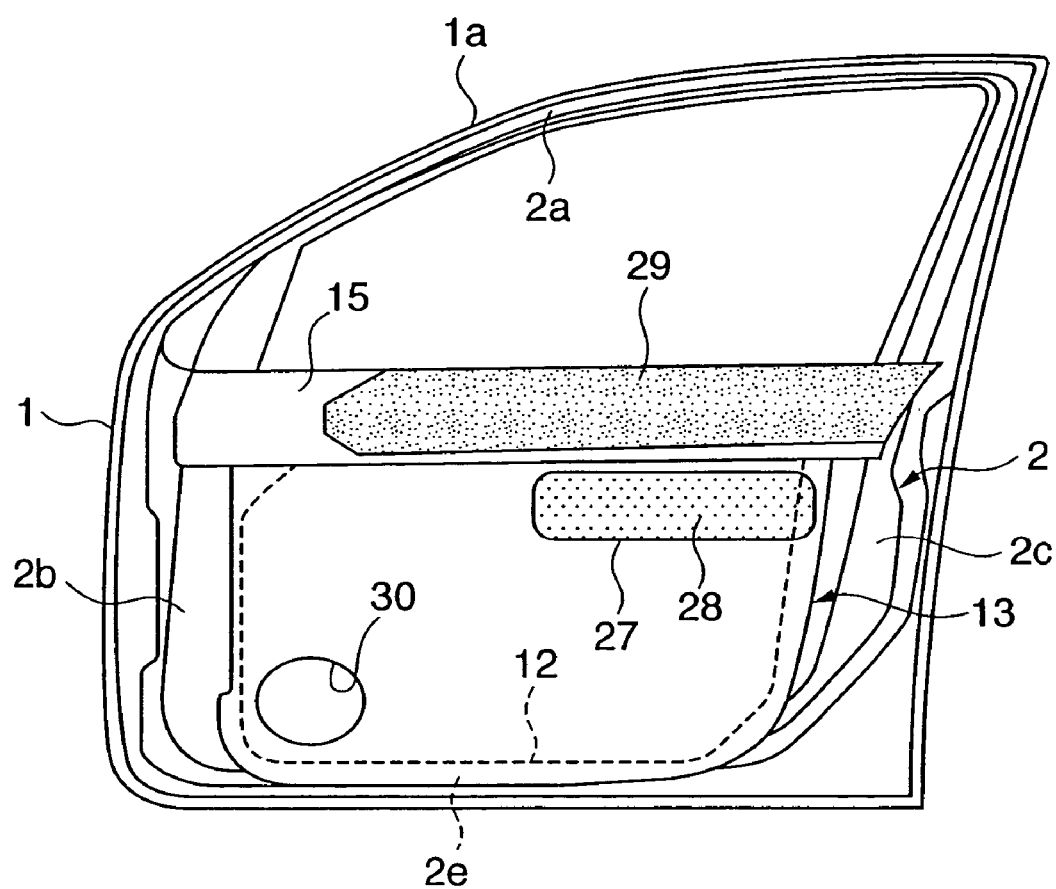
FIG. 6 is a side view of a door to which a carrier plate is attached.

As shown in FIG. 6, fine uneven embosses 28 are simultaneously molded on the exposed portion 27 which opposes the opening 22. On the upper trim portion 15, a cloth portion 29 (so-called fabric portion) is bonded and fixed to the vehicle compartment side of the trim skin 19 (see FIG. 4) to improve the design. In place of the cloth portion 29, a leather portion may be formed. In FIG. 6, the embosses 28 and cloth portion 29 are indicated by dots for the illustrative convenience. In FIG. 6, reference numeral 30 denotes a hole portion (loudspeaker attaching hole) to attach the loudspeaker 14 therein.

Figure 7:
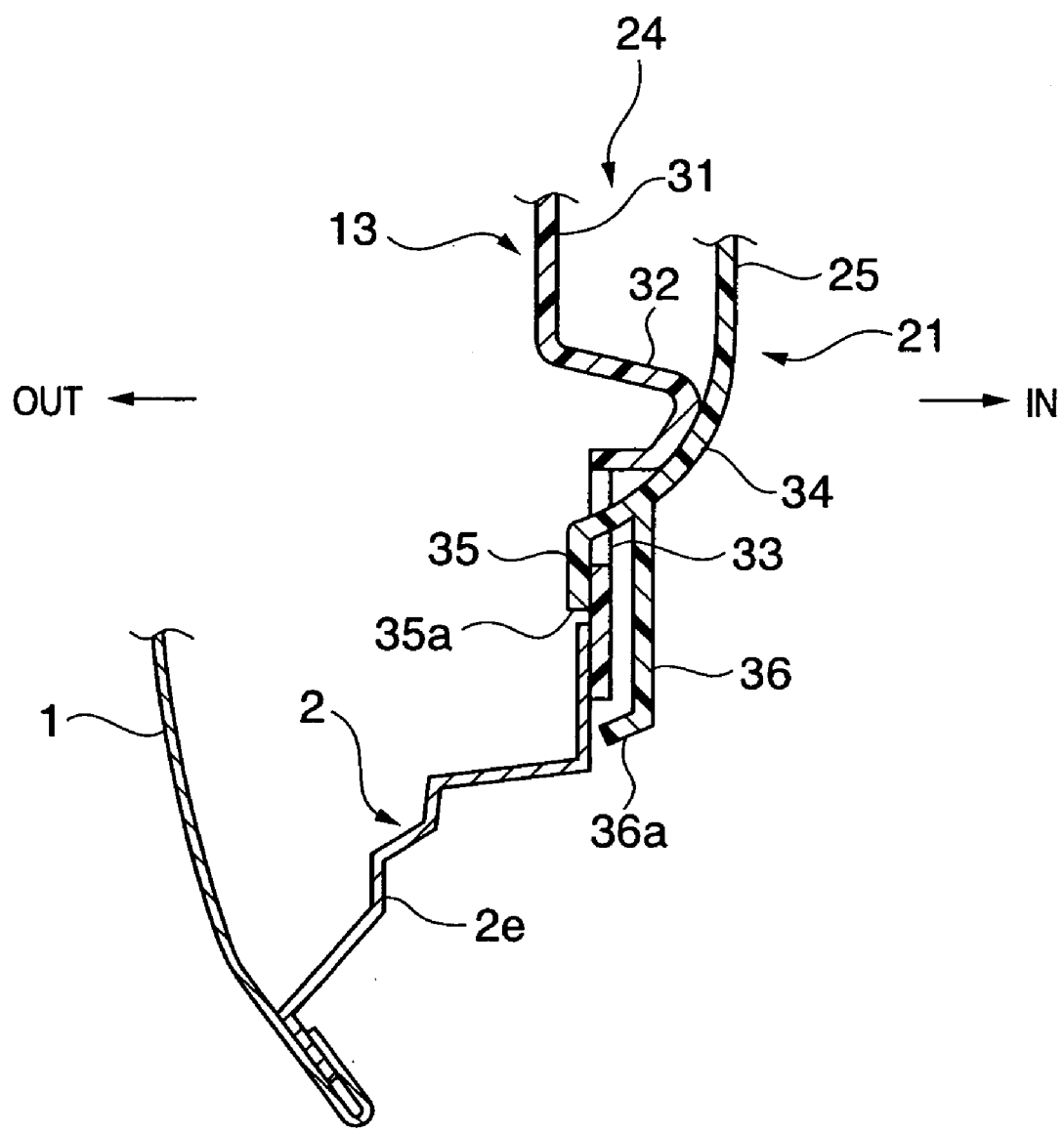
FIG. 7 is an enlarged sectional view of the main part taken along the line B—B of FIG. 1.

As the pocket front surface portion 25 which forms the pocket portion 24 is formed on the lower portion of the trim plate 21 described above, a pocket rear surface portion 31 is formed on the corresponding portion of the carrier plate 13 which opposes the pocket front surface portion 25, as shown in FIGS. 4 and 7. The two members, i.e., the trim plate 21 and carrier plate 13, form the pocket portion 24 described above.

According to this embodiment, the lower portion of the pocket rear surface portion 31 extends toward the pocket front surface portion 25 to form a pocket bottom portion 32 on the carrier plate 13 integrally. As shown in FIG. 7, engaging holes 33 with which the trim plate 21 is engaged are formed at a plurality of portions, e.g., two, front and rear portions, of the lower portion of the pocket portion 24.

The lower portion of the pocket portion 24 of the trim plate 21 is curved outwardly in the vehicle widthwise direction to integrally form a curved portion 34. A pair of inner and outer engaging pawls 35 and 36 are integrally formed on the lower end portion of the curved portion 34.

The outer engaging pawl 35 in the vehicle widthwise direction extends from the lower end of the curved portion 34 straightly downward to a position where it overlaps the lower open edge of the corresponding engaging hole 33. A taper portion 35a is formed on the lower end portion of the engaging pawl 35. The inner engaging pawl 36 in the vehicle widthwise direction extends from the lower end portion of the curved portion 34 further downward beyond the lower end of the carrier plate 13. A bent portion 36a which is bent toward the outside of the vehicle is integrally formed on the lower end portion of the engaging pawl 36.

The engaging pawl 35 is inserted in the engaging hole 33 from above. The engaging hole 33 engages from above with the pair of inner and outer engaging pawls 35 and 36. In FIG. 7, an arrow IN indicates an inward direction of the vehicle, and an arrow OUT indicates an outward direction of the vehicle.

In this manner, the automobile door structure of the embodiment shown in FIGS. 1 to 7 is an automobile door structure formed by joining the outer panel 1 and inner panel 2 to each other. The opening portion 12 is formed in the inner panel 2. The resin-made carrier plate 13 which supports the accessories (see the window regulator 9 and loudspeaker 14) of the door is attached to the inner panel 2 so as to cover the opening portion 12. The upper trim portion 15 extending to cover the vehicle compartment side of the belt portion 2d (that is, the upper side portion of the inner panel 2) of the inner panel 2 is integrally molded on the upper portion of the carrier plate 13. The trim plate 21 is attached to that portion of the carrier plate 13 which is below the upper trim portion 15 so as to cover the vehicle compartment side of the carrier plate 13.

With this arrangement, since the upper trim portion 15 is formed on the carrier plate 13, a wood board as a reinforcing member for the upper trim portion can be omitted. Thus, the expensive trim plate 21 can be downsized, thus achieving cost reduction.

As the trim plate 21 is downsized, it can be molded easily, attached easily, and handled easily.

Since the upper trim portion 15 is integrally molded on the carrier plate 13, the weight of the carrier plate 13 increases by the weight of the upper trim portion 15. The carrier plate 13 is originally heavy as auxiliary members such as the window regulator 9 and loudspeaker 14 are attached to it. Thus, the carrier plate 13 can be attached without degrading operability.

The carrier plate 13 is partly covered by the trim plate 21 to have the exposed portion 27 being left exposed. The exposed portion 27 is molded with the embosses 28 (see FIG. 6) simultaneously.

With this arrangement, since the embosses 28 are formed on the exposed portion 27 of the carrier plate 13, the appearance can be improved. Also, because of the presence of the exposed portion 27, the opening 22 portion can be formed in the trim plate 21. Hence, the size or weight of the trim plate 21 can be decreased.

As the carrier plate 13 is colored, when it is colored with arbitrary hue, its design can be further improved.

In addition, the trim skin 19 is molded on the upper trim portion 15 simultaneously.

With this arrangement, since the trim skin 19 is molded on the upper trim portion 15 simultaneously, the design can be further improved.

The draining inner member (see draining inner seal 20) for the window glass panel 10 is integrally formed on the upper trim portion 15.

With this arrangement, when the window glass panel 10 moves vertically, water attaching to it is drained by the draining inner member (see draining inner seal 20). Thus, water is prohibited from entering the door. Also, when closing the door from an open state, if a passenger touches the surface of the window glass panel 10, he or she will not get wet.

The trim plate 21 includes the pocket front surface portion 25. The pocket rear surface portion 31 is formed at the corresponding portion of the carrier plate 13 which opposes the pocket front surface portion 25.

With this arrangement, since the carrier plate 13 can substitute for the pocket rear surface portion 31, as opposed to a structure in which the entire front and rear surfaces of a pocket are formed in the trim plate 21, the moldability of the trim plate 21 can be improved.

In addition, the engaging holes 33 with which the trim plate 21 is engaged are formed in the lower portion of the pocket rear surface portion 31. Engaging portions (see the pair of inner and outer engaging pawls 35 and 36), which are inserted in the corresponding engaging hole 33 to engage with it from above, are formed on the lower end of the pocket portion 24 of the trim plate 21.

With this arrangement, the engaging portion (see the engaging pawl 35) is inserted in the engaging hole 33 described above. The lower portion of the engaging hole 33 engages with the pair of inner and outer engaging pawls 35 and 36. When compared to a structure in which the engaging portion of a trim plate is vertically inserted in the engaging hole of a carrier plate, a gap in the lower portion of the pocket portion 24 including two members (the carrier plate 13 and trim plate 21) can be prevented with a simple structure.

Figure 8:
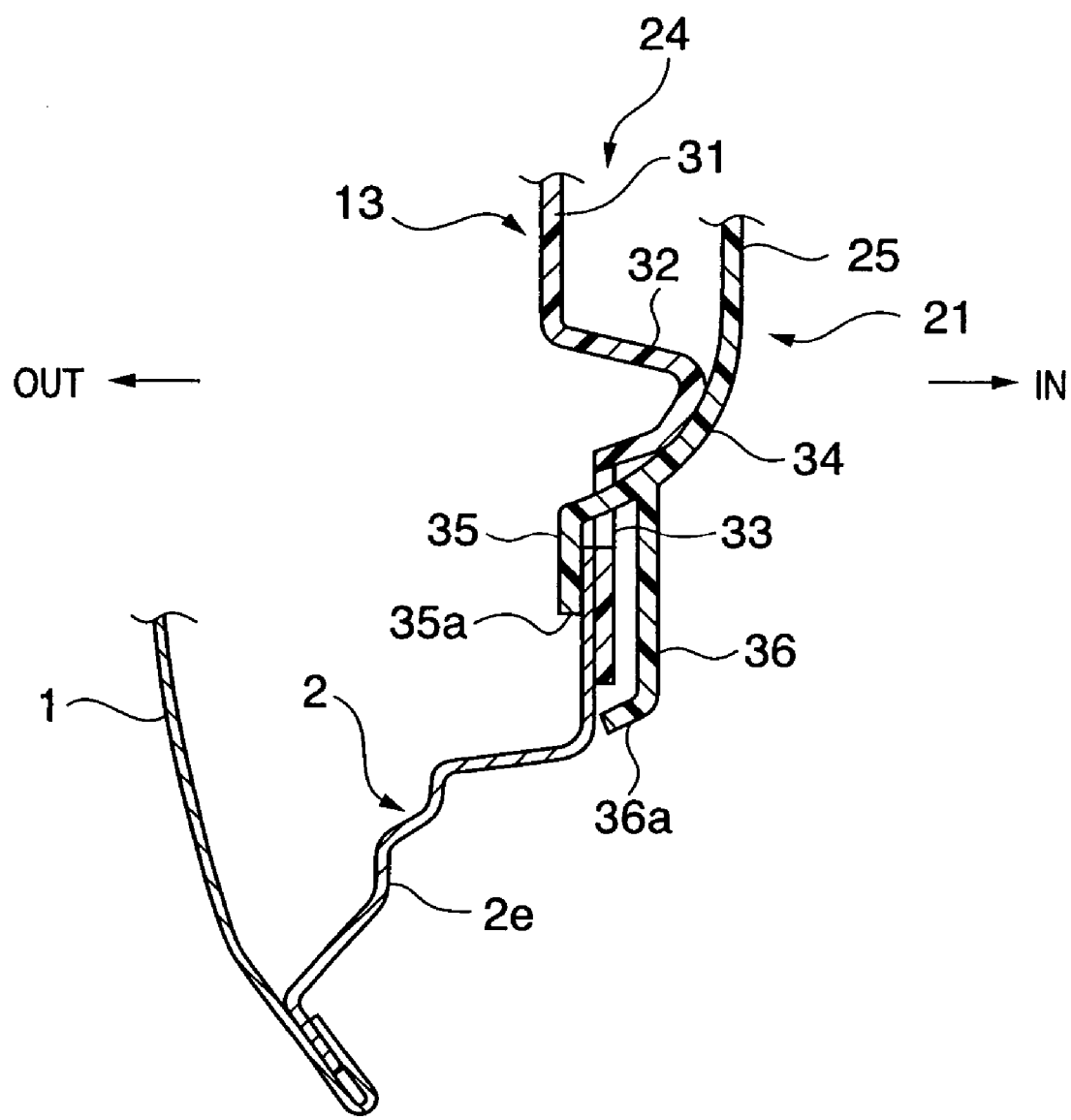
FIG. 8 is a sectional view showing another example of an engaging structure including engaging pawls.

FIG. 8 shows another example of the engaging structure including the engaging pawls 35 and 36. In the embodiment shown in FIG. 7, the engaging pawl 35 is secured by only the open edge portion of the engaging hole 33 of the carrier plate 13. In the example shown in FIG. 8, the engaging pawl 35 is secured by both the open edge portion of the engaging hole 33 of the carrier plate 13 and the upper end of the lower side portion 2e of the inner panel 2.

With this arrangement, the support rigidity of the trim plate 21 can be improved. Particularly, the support strength of the trim plate 21 when the door is closed can be improved.

Other arrangements, function, and effect of the example shown in FIG. 8 are the same as those of the embodiment described above. Thus, those portions of FIG. 8 which are identical to those of FIG. 7 are denoted by the same reference numerals, and a detailed description thereof will be omitted.

<Second Embodiment>

The second embodiment of the present invention will be described in detail with reference to the accompanying drawings.

Figure 9:
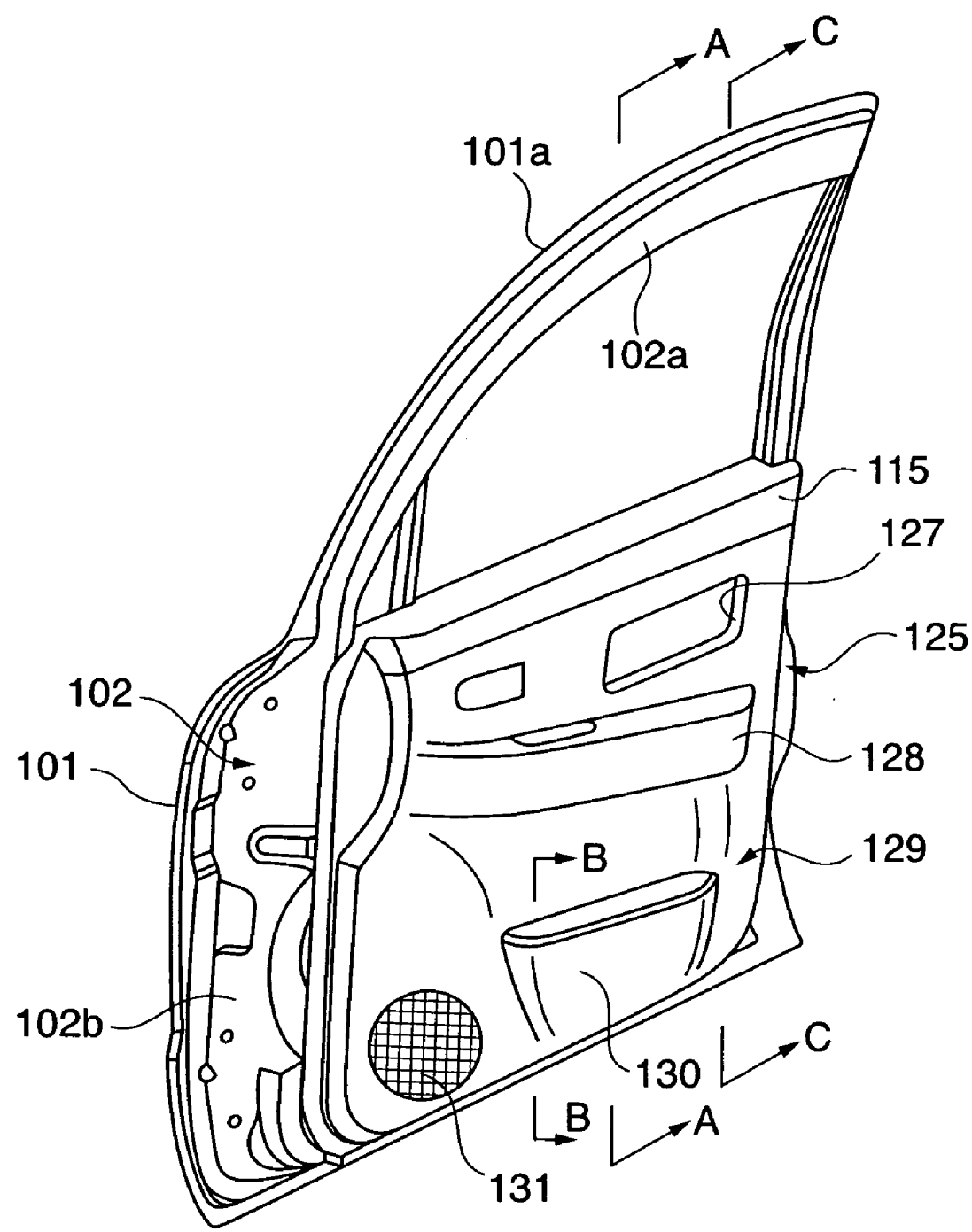
FIG. 9 is a perspective view showing an automobile door structure according to the second embodiment of the present invention.
Figure 10:
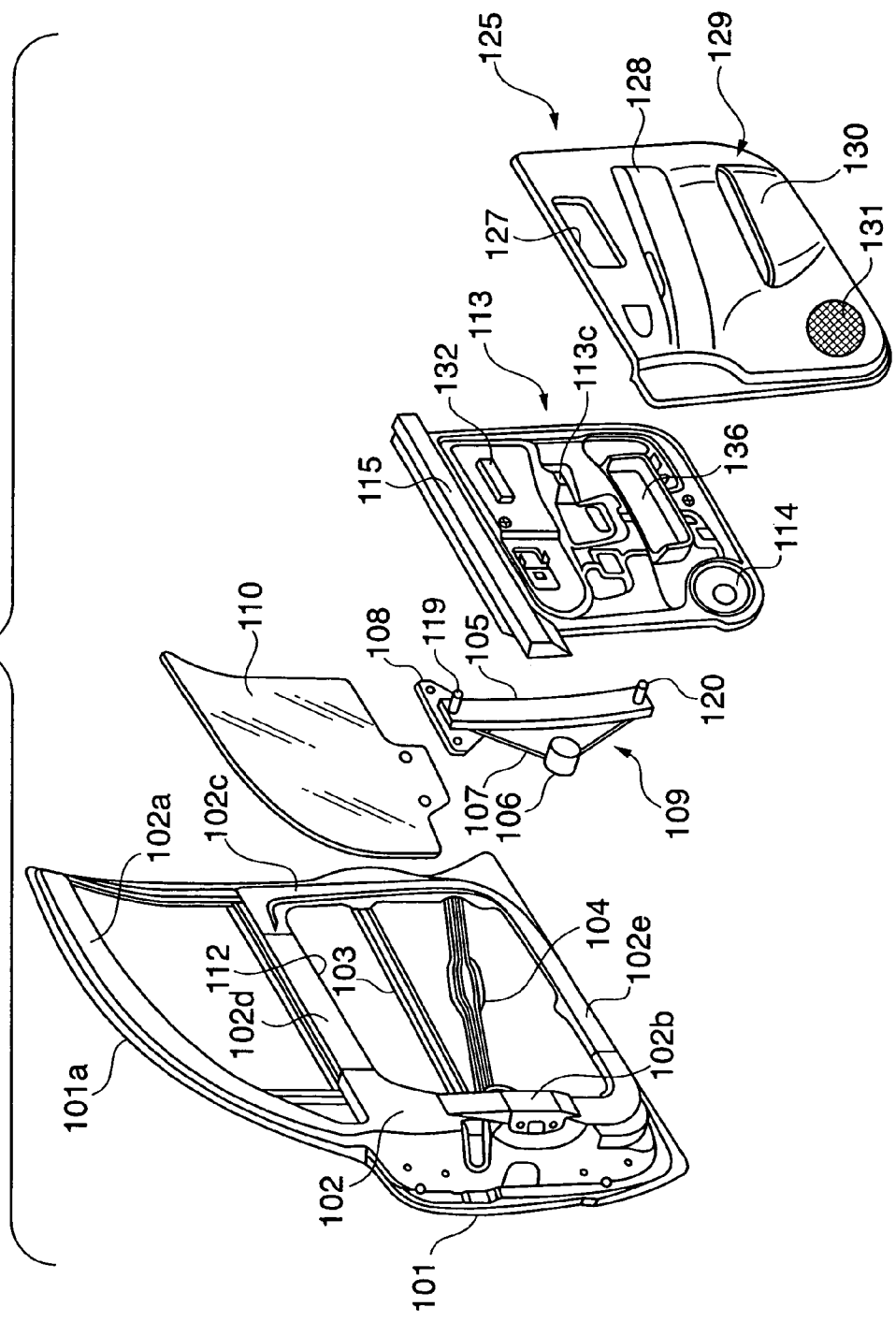
FIG. 10 is an exploded perspective view of FIG. 9.
Figure 11:
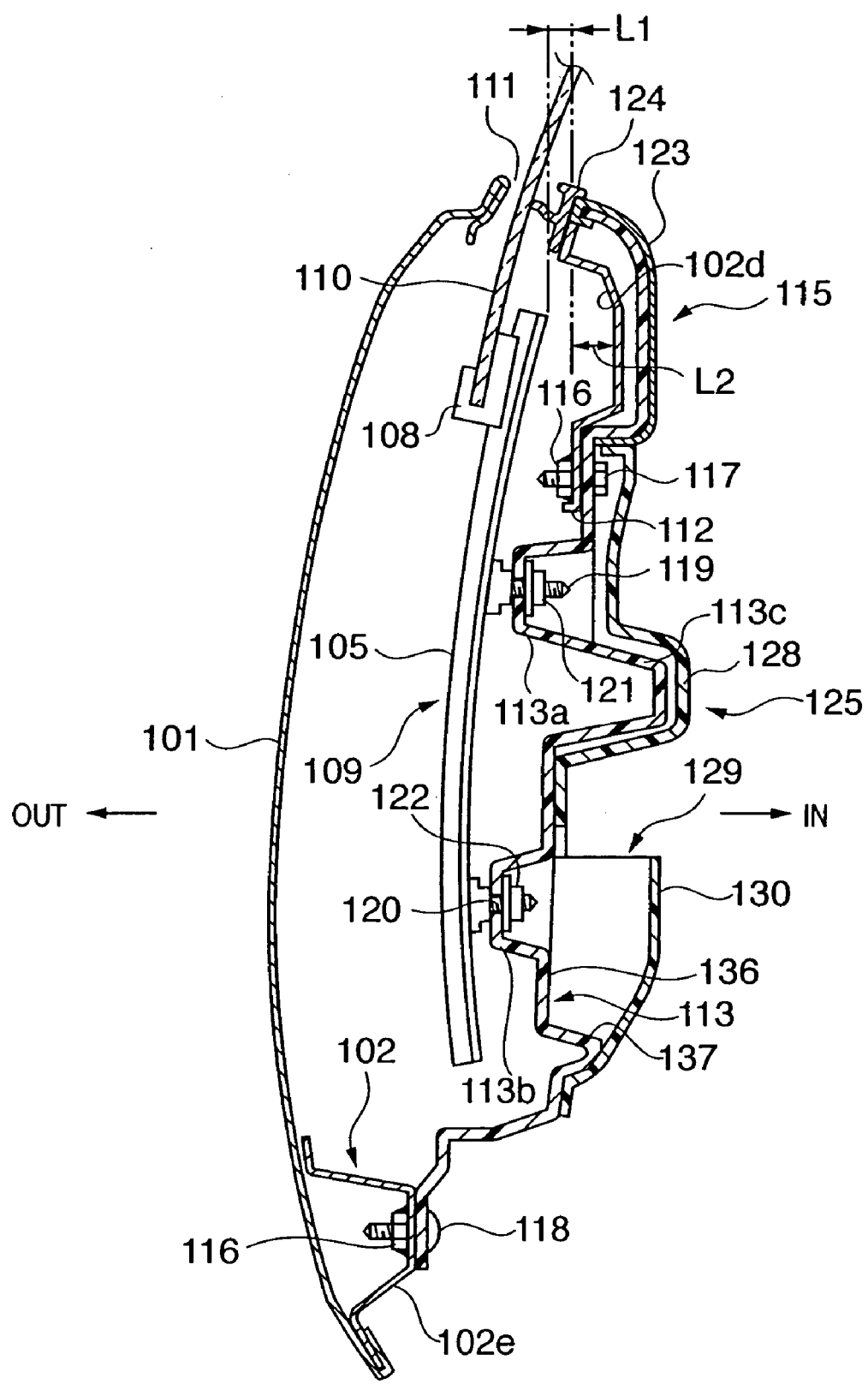
FIG. 11 is a sectional view of the main part taken along the line A—A of FIG. 9.
Figure 12:
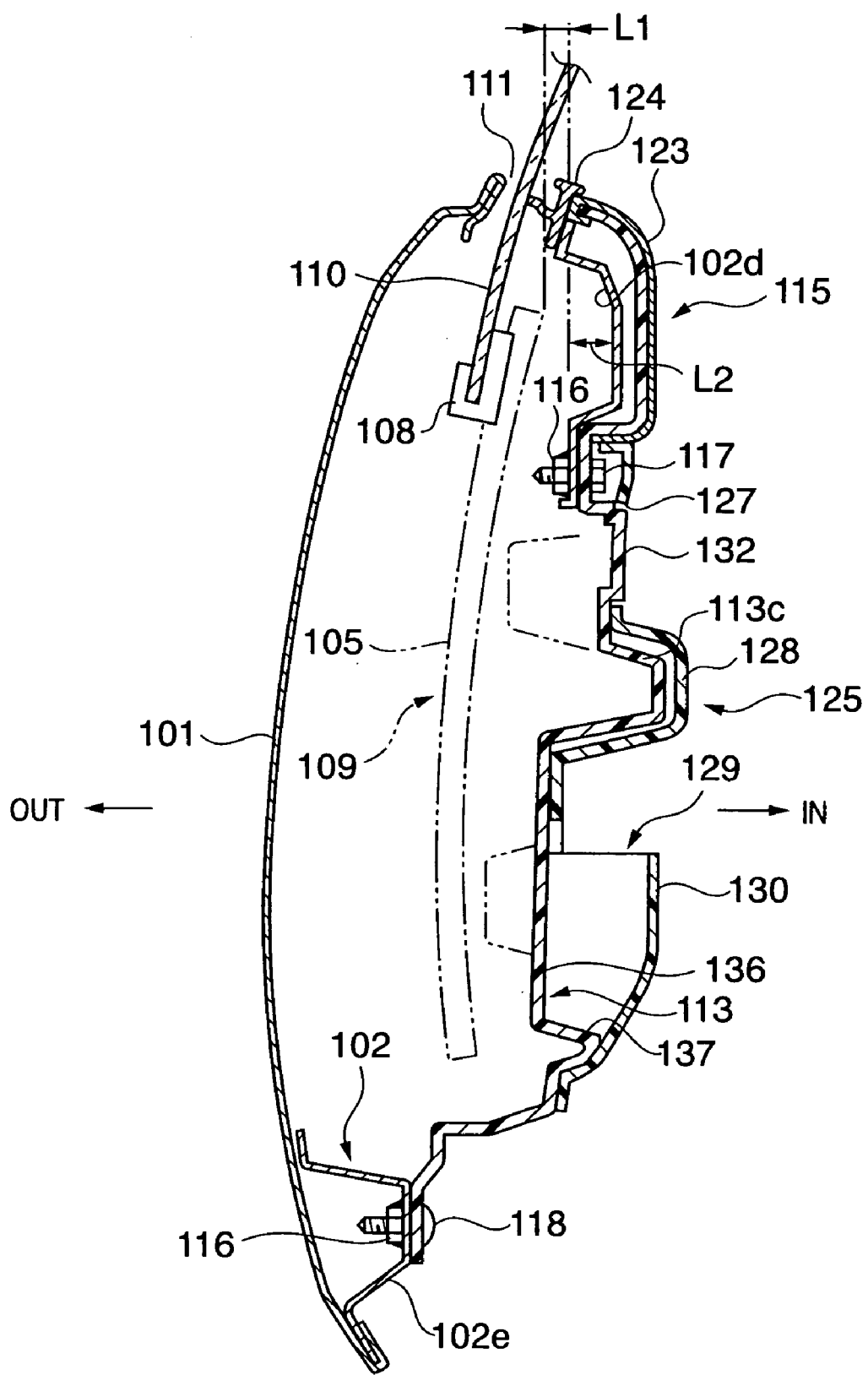
FIG. 12 is a sectional view of the main part taken along the line C—C of FIG. 9.

The accompanying drawings show an automobile door structure, in which FIG. 9 is a perspective view showing an automobile door structure according to this embodiment, FIG. 10 is an exploded perspective view of the same, FIG. 11 is a sectional view of the main part taken along the line A—A of FIG. 9, and FIG. 12 is a sectional view of the main part taken along the line C—C of FIG. 9. Referring to FIGS. 9 to 12, the automobile door structure is formed by bonding an outer panel 101 and inner panel 102.

The outer panel 101 and inner panel 102 include door main body portions and sash portions 110a and 102a, respectively. Although this embodiment exemplifies a front door having the sash portions 110a and 102a, the automobile door structure of this embodiment can also be applied to a sash-less front door or rear door.

As shown in FIG. 10, impact bars 103 and 104 extend through the space in the door in the back-and-forth direction of the vehicle, to ensure rigidity against side collision. More specifically, the upper and lower impact bars 103 and 104 are joined and fixed to predetermined portions of the inner panel 102.

As shown in FIGS. 10 and 11, a window regulator 109 including a regulator rail 105, motor 106, wire 107, and slider 108 is disposed in the space in the door. The slider 108 of the window regulator 109 vertically moves a window glass panel 110.

The window glass panel 110 (including one made of reinforced plastic) is moved in the vertical direction through an opening 111 for vertical movement of the window glass panel which is formed in the upper end of the door main body portion. A weather strip or draining inner seal (not shown) is attached to the upper end portion of the outer panel 101 corresponding to the opening 111.

The inner panel 102 is formed of a metal plate such as a steel plate. As shown in FIG. 10, the door main body portion of the inner panel 102 includes an inner panel front side portion 102b which forms its front side and is openably/closeably attached to the vehicle body through a hinge member (a hinge member including a door-side hinge bracket, hinge pin, and body-side hinge bracket), an inner panel rear side portion 102c which forms its rear side, a belt portion 102d (a belt portion which forms the lower side of the window) extending between the upper portions of the inner panel front side portion 102b and inner panel rear side portion 102c, and an inner panel lower side portion 102e which forms its lower side. An opening portion 112 is formed in the door main body portion to leave the side portions 102b, 102c, 102d, and 102e.

In other words, the opening portion 112 is surrounded on all sides by the inner panel front side portion 102b, inner panel rear side portion 102c, belt portion 102d, and inner panel lower side portion 102e.

A resin-made carrier plate 113 is arranged to cover the opening portion 112 of the inner panel 102 from the vehicle compartment side. The carrier plate 113 is made of a resin such as FRP (Fiber-Reinforced Plastic such as glass, carbon, stainless steel, or the like), and supports the window regulator 109 and a loudspeaker 114 (see FIG. 10) as the accessories (door function components) of the door.

As shown in FIG. 11, the carrier plate 113 is integrally molded with support portions 113a and 113b for the window regulator rail 105 and an armrest support portion 113c simultaneously.

In addition, an upper trim portion 115 extending to cover the vehicle compartment side of the belt portion 102d of the inner panel 102 is integrally molded (simultaneous molding) on the upper portion of the carrier plate 113 from the same material such as FRP.

The carrier plate 113 is attached to the inner panel 102 so as to cover the opening portion 112. As shown in FIG. 11, nuts 116 are welded and fixed to the inner panel 102 to correspond to the periphery of the opening portion 112 in advance. The carrier plate 113 is attached and fixed to the periphery of the opening portion 112 by using attaching members such as bolts 117 and machine screws 118.

As shown in FIGS. 11 and 12, with the carrier plate 113 integrally formed with the upper trim portion 115 being attached to the opening portion 112 of the inner panel 102, the upper end of the carrier plate 113, or the upper end of the upper trim portion 115 and the upper end of the window regulator rail 105 in this embodiment are located above the lower end (the upper open edge of the opening portion 112) of the inner panel belt portion 102d.

As shown in FIGS. 11 and 12, with the carrier plate 113 being attached to the opening portion 112 of the inner panel 102 and the window regulator rail 105 being attached in the proper position, a gap L1 in the vehicle widthwise direction between the upper end of the window regulator rail 105 and the upper end of the carrier plate 113 (in this embodiment, the upper end of the upper trim portion 115) is set smaller than a thickness L2 in the vehicle widthwise direction of the belt portion 102d between the carrier plate 113 and window regulator rail 105. Alternatively, the upper end of the window regulator rail 105 and the upper end of the carrier plate 113 may overlap in the vehicle widthwise direction. In other words, the gap L1 and thickness L2 are set to satisfy L1<L2.

Figure 13:
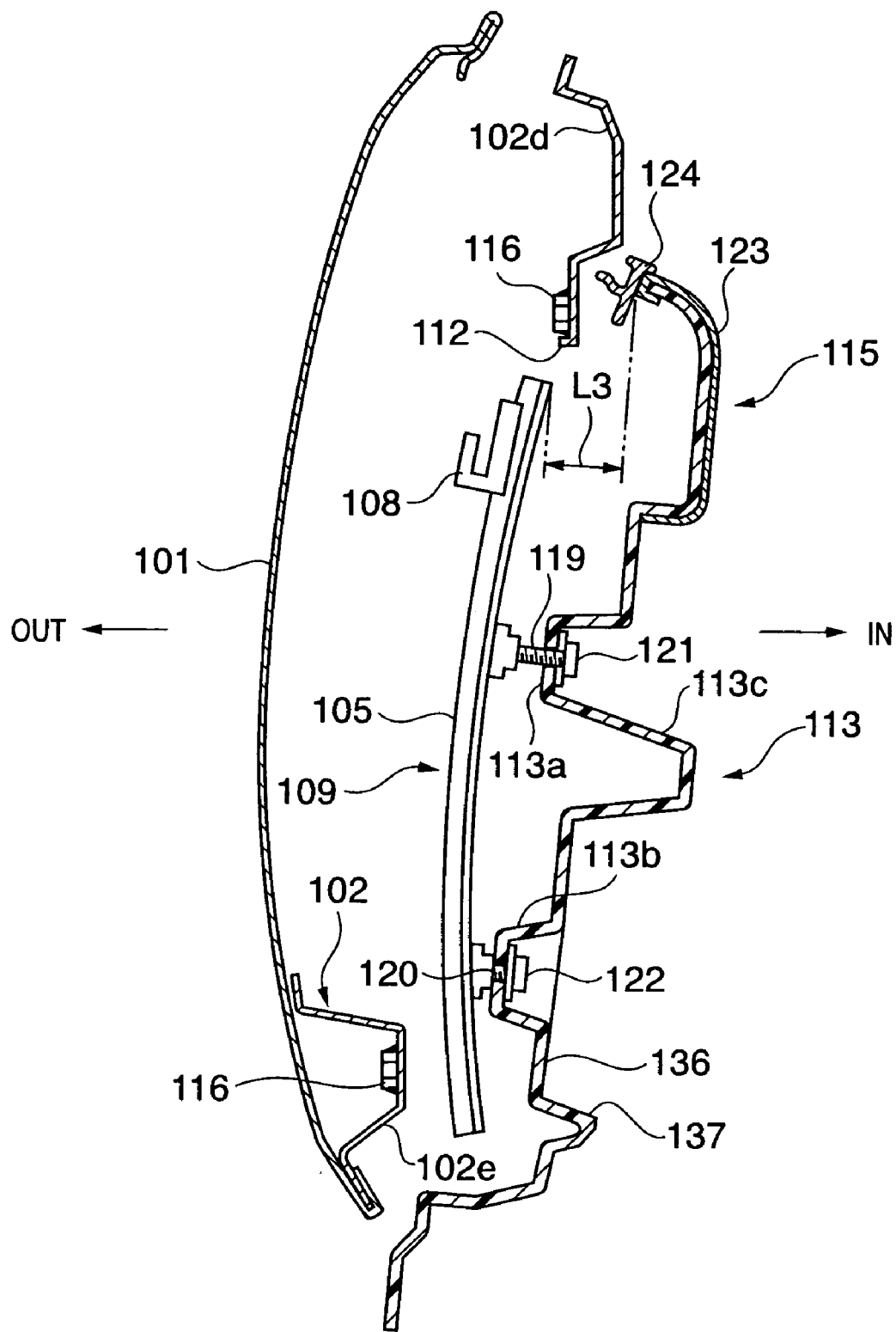
FIG. 13 is a view for explaining a state before a window regulator rail and carrier plate are built together.

As shown in FIG. 13, before the carrier plate 113 is built in the opening portion 112 of the inner panel 102, the window regulator rail 105 is built on the carrier plate 113 in advance.

For this purpose, stud bolts 119 and 120 serving as attaching members projecting toward the carrier plate 113 are arranged at those positions of the window regulator rail 105 which correspond to the support portions 113a and 113b.

Nuts 121 and 122, which are fastened on the stud bolts 119 and 120 of the window regulator rail 105 from the vehicle compartment side, are arranged on the carrier plate 113. The upper stud bolt 119 is longer than the lower stud bolt 120.

As shown in FIG. 13, the window regulator rail 105 is temporarily fixed to the carrier plate 113 such that it is separate from the proper attaching position (see FIG. 11) toward the outside of the vehicle.

More specifically, the upper and lower stud bolts 119 and 120 of the window regulator rail 105 are inserted in the loose-fit insertion holes of the support portions 113a and 113b of the carrier plate 113. The nuts 121 and 122 are fastened on the projecting portions of the stud bolts 119 and 120 projecting into the vehicle compartment from the support portions 113a and 113b. The upper nut 121 is threadably engaged with the projecting end of the stud bolt 119, and the lower nut 122 is threadably engaged with the projecting portion of the stud bolt 120 to almost the proper attaching position. Thus, a gap L3 in the vehicle widthwise direction between the upper end of the window regulator rail 105 and the upper end of the upper trim portion 115 of the carrier plate 113 is set large.

The gap L3 for temporarily fixing is set to satisfy L3>L2>L1.

As shown in FIG. 13, the carrier plate 113 is inserted in the opening portion 112 from below to be set in the state shown in FIG. 14, such that the belt portion 102*d* located at the upper edge of the opening portion 112 of the inner panel 102 is positioned between the upper portion of the carrier plate 113 and the upper portion of the window regulator rail 105. The carrier plate 113 is then fixed to the periphery of the opening portion 112 by using the attaching members (see FIG. 11) such as the bolts 117 or machine screws 118. After that, the upper and lower nuts 121 and 122 are fastened completely from the vehicle compartment side, so that the window regulator rail 105 is attached to the proper attaching position, as shown in FIG. 11.

Figure 14:
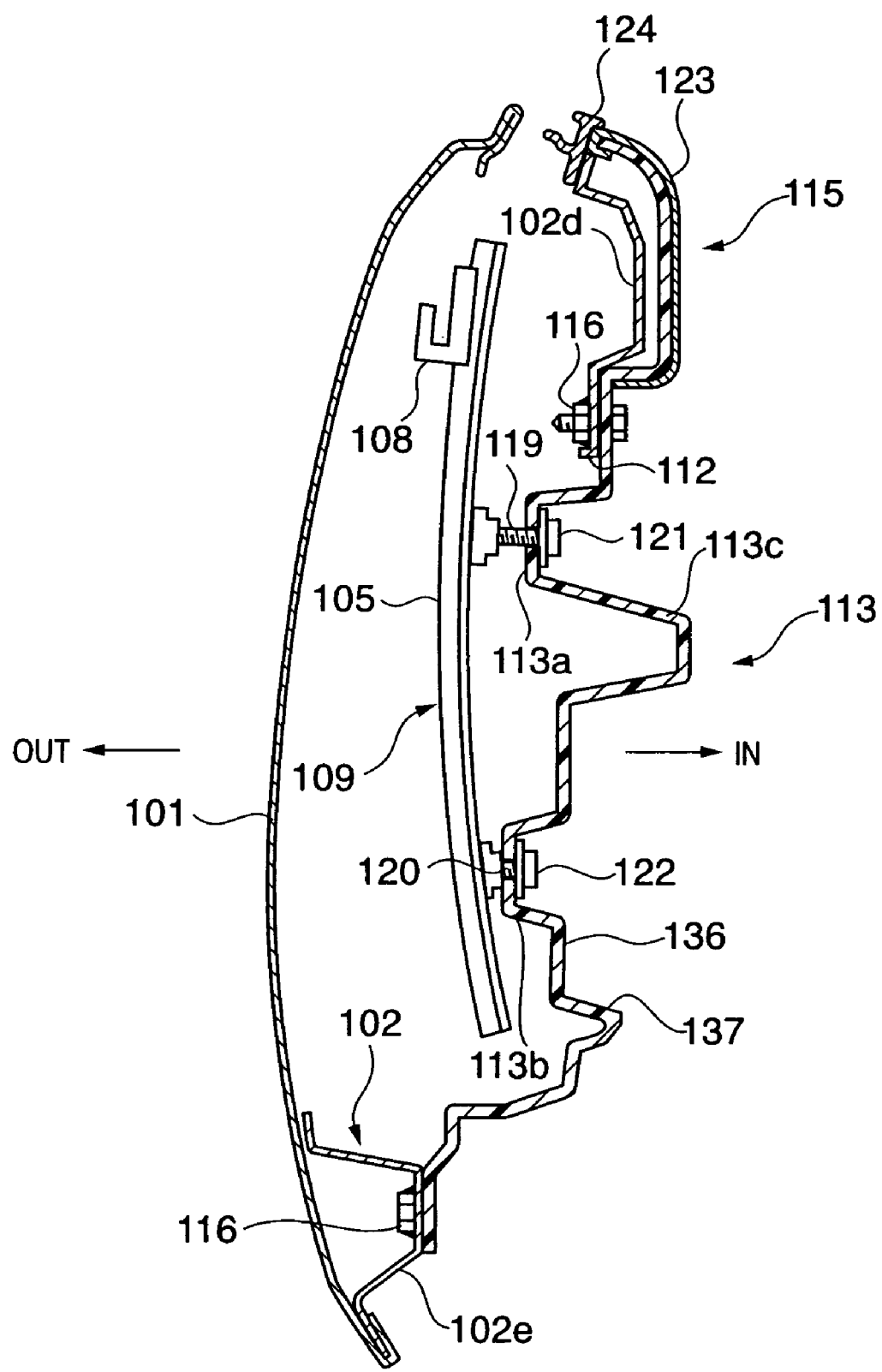
FIG. 14 is a view for explaining a state wherein the window regulator rail is temporarily fixed.
Figure 15:
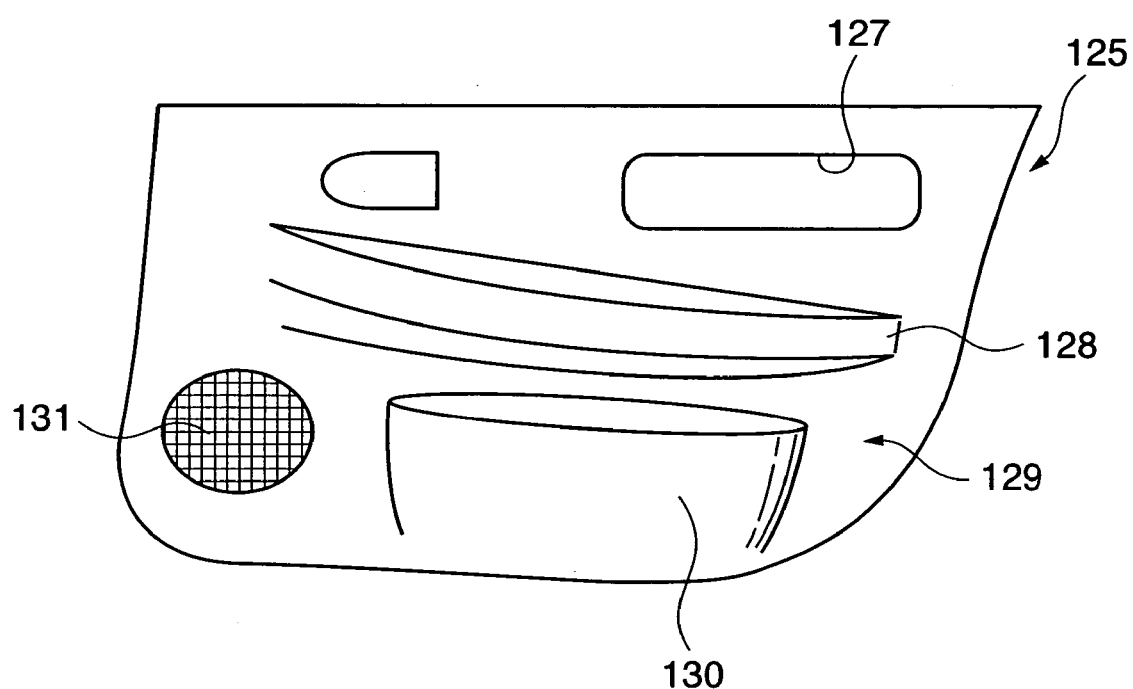
FIG. 15 is a side view of a trim plate.

In other words, to shift the window regulator rail 105 from the temporary fixing position shown in FIG. 14 to the proper attaching position shown in FIG. 11, only the nuts 121 and 122 described above need be fastened by turning them from the vehicle compartment side.

The carrier plate 113 is colored with arbitrary hue in advance. A trim skin 123 is molded on the upper trim portion 115 on the carrier plate 113 simultaneously. As the material to form the trim skin 123, PVC (PolyVinyl Chloride) or the like can be used.

A draining inner seal 124 (draining inner member) which drains water attaching to the window glass panel 110 is integrally formed on the upper end portion of the upper trim portion 115 which opposes the window glass panel 110.

As shown in FIG. 12, a trim plate 125 is attached to that portion of the carrier plate 113 which is below the upper trim portion 115, to cover the vehicle compartment side of the carrier plate 113.

The trim plate 125 is formed of a decorative laminated sheet. As shown in FIGS. 10, 11, 12, and 15, the trim plate 125 is integrally, simultaneously molded with an opening 127 in its upper portion, armrest portion 128 at its intermediate portion in the vertical direction, pocket front surface portion 130 at its lower portion to form a pocket portion 129, and loudspeaker grille 131 at its lower front portion.

Figure 16:
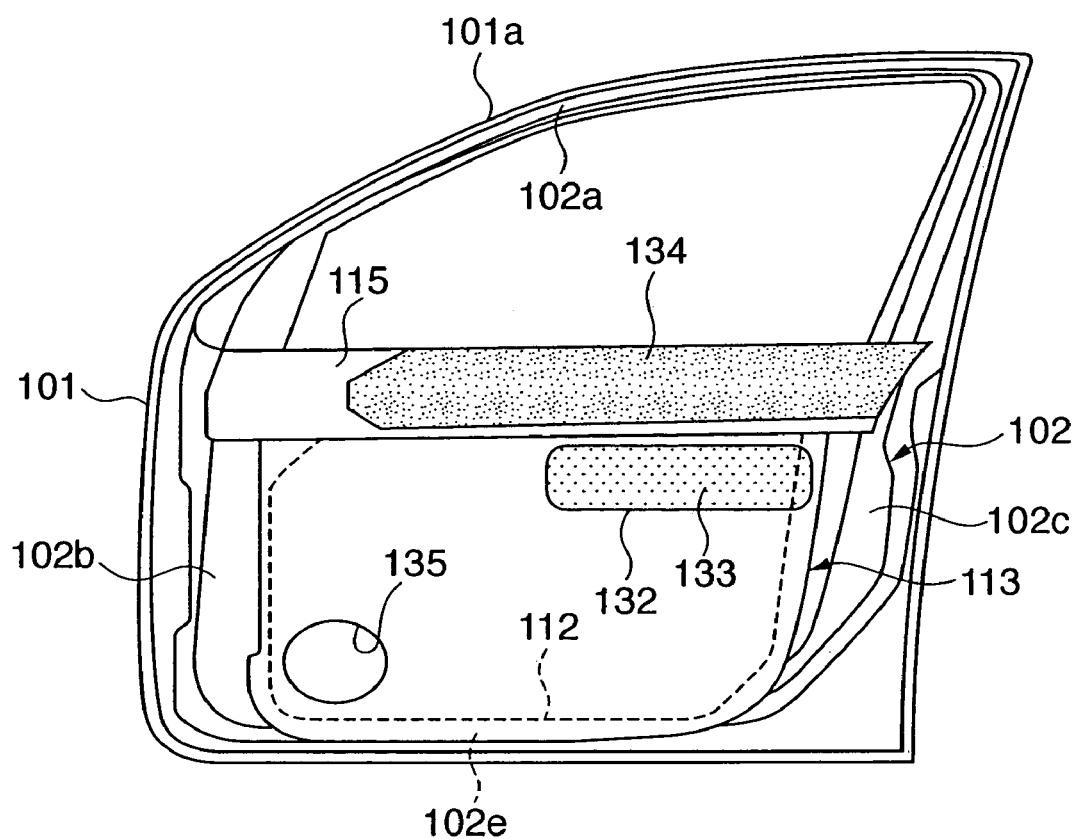
FIG. 16 is a side view showing a state wherein the carrier plate is built on a door.

Since the opening 127 is formed in the trim plate 125, an exposed portion 132 which is not covered by the trim plate 125 is formed in the carrier plate 113, as shown in FIGS. 12 and 16.

As shown in FIG. 16, fine uneven embosses 133 are simultaneously molded on the exposed portion 132 which opposes the opening 127. On the upper trim portion 115, a cloth portion 134 (so-called fabric portion) is bonded and fixed to the vehicle compartment side of the trim skin 123 (see FIGS. 11 and 12) to improve the appearance and design. In place of the cloth portion 134, a leather portion may be formed. In FIG. 16, the embosses 133 and cloth portion 134 are indicated by dots for the illustrative convenience. In FIG. 16, reference numeral 135 denotes a hole portion (loudspeaker attaching hole) to attach the loudspeaker 114 therein.

Figure 17:
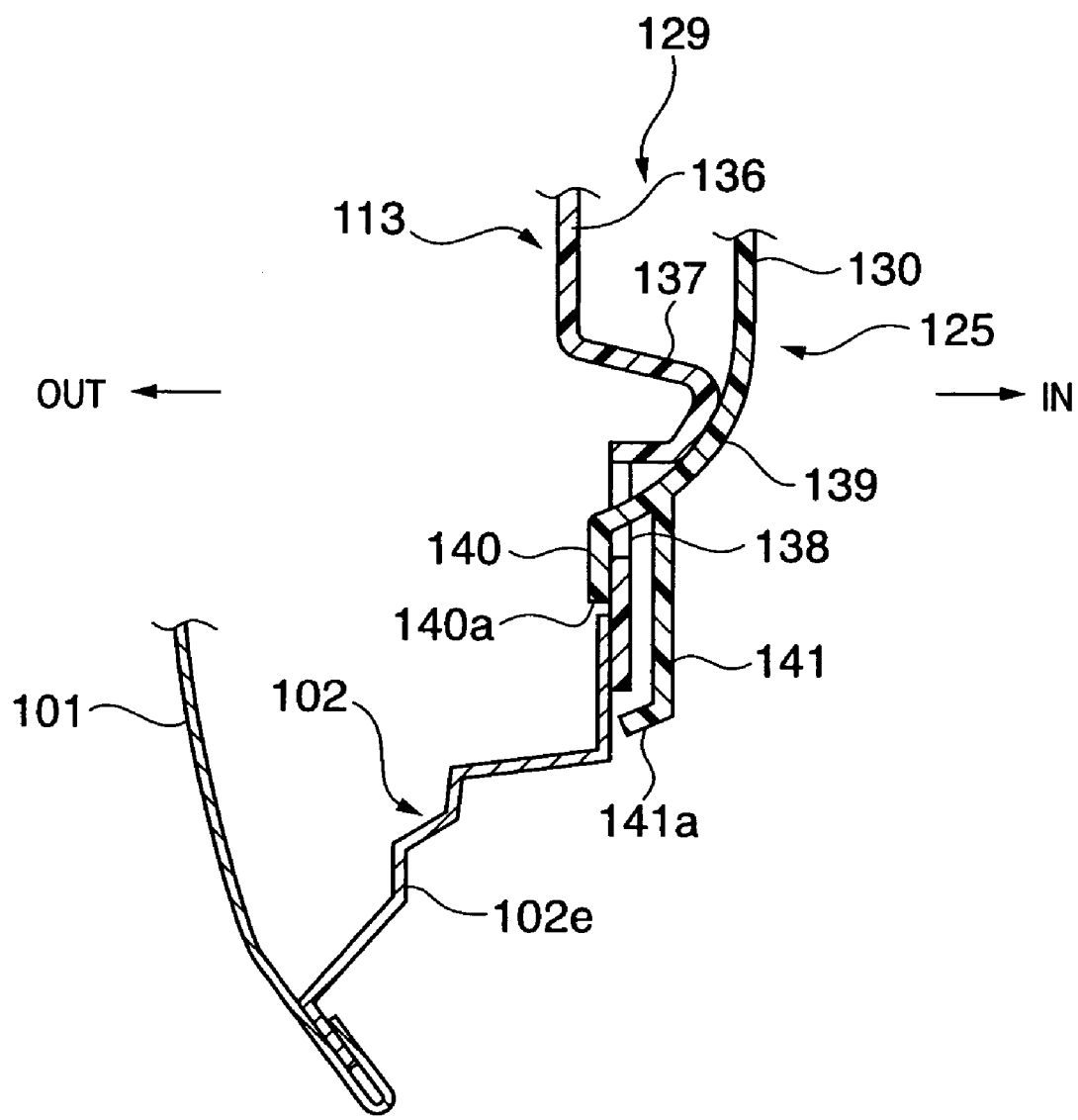
FIG. 17 is an enlarged sectional view of the main part taken along the line B—B of FIG. 9.

As the pocket front surface portion 130 which forms the pocket portion 129 is formed on the lower portion of the trim plate 125 described above, a pocket rear surface portion 136 is formed on the corresponding portion of the carrier plate 113 which opposes the pocket front surface portion 130, as shown in FIGS. 11, 12, and 17. The two members, i.e., the trim plate 135 and carrier plate 113, form the pocket portion 129 described above.

According to this embodiment, the lower portion of the pocket rear surface portion 136 extends toward the pocket front surface portion 130 to form a pocket bottom portion 137 on the carrier plate 113 integrally. As shown in FIG. 17, engaging holes 138 with which the trim plate 125 is engaged are formed at a plurality of portions, e.g., two, front and rear portions, of the lower portion of the pocket portion 129.

The lower portion of the pocket portion 129 of the trim plate 125 is curved outwardly in the vehicle widthwise direction to integrally form a curved portion 139. A pair of inner and outer engaging pawls 140 and 141 are integrally formed on the lower end portion of the curved portion 139.

The outer engaging pawl 140 in the vehicle widthwise direction extends from the lower end of the curved portion 139 straightly downward to a position where it overlaps the lower open edge of the corresponding engaging hole 138. A taper portion 140*a* is formed on the lower end portion of the engaging pawl 140. The inner engaging pawl 141 in the vehicle widthwise direction extends from the lower end portion of the curved portion 139 further downward beyond the lower end of the carrier plate 113. A bent portion 141*a* which is bent toward the outside of the vehicle is integrally formed on the lower end portion of the engaging pawl 140.

The engaging pawl 140 is inserted in the engaging hole 138 from above. The engaging hole 138 engages from above with the pair of inner and outer engaging pawls 140 and 141. In FIG. 17, an arrow IN indicates an inward direction of the vehicle, and an arrow OUT indicates an outward direction of the vehicle.

In this manner, the automobile door structure of the embodiment shown in FIGS. 9 to 17 is an automobile door structure which is formed by joining the outer panel 101 and inner panel 102 to each other and which includes the vertically movable window glass panel 110. The inner panel 102 includes the inner panel front side portion 102*b* which forms its front side, the inner panel rear side portion 102*c* which forms its rear side, the belt portion 102*d* which extends between the upper portions of the inner panel front side portion 102*b* and inner panel rear side portion 102*c*, and the opening portion 112 surrounded by the inner panel front side portion 102*b*, inner panel rear side portion 102*c*, and belt portion 102*d*. The resin-made carrier plate 113 is provided which is disposed closer to the outer panel 101 than the inner panel 102 and which is built with the window regulator rail 105 in advance that allows vertical movement of the window glass panel 110. The carrier plate 113 is attached to the opening portion 112. The window regulator rail 105 is temporarily fixed (see FIGS. 13 and 14) to the carrier plate 113 to be separate from the regular attaching position (see FIG. 11). The carrier plate 113 is attached to the opening portion 112 such that the belt portion 102*d* of the inner panel 102 is positioned between the upper portion of the carrier plate 113 and the upper portion of the window regulator rail 105. After that, the window regulator rail 105 is attached to the proper attaching position (see FIG. 11).

With this arrangement, the window regulator rail 105 is built on the carrier plate 113 in advance. The window regulator rail 105 is temporarily fixed to the carrier plate 113 such that at least its upper portion is separate from the proper attaching position toward the outside of the vehicle body. During temporary fixing, the gap L3 (see FIG. 13) in the vehicle widthwise direction between the upper end of the window regulator rail 105 and the upper end of the carrier plate 113 is set large.

The carrier plate 113 is attached to the opening portion 112 such that the belt portion 102*d* of the inner panel 102 positioned between the upper portion of the carrier plate 113 and the upper portion of the window regulator rail 105. After that, the window regulator rail 105 is shifted from the temporary fixing position (see FIG. 14) and attached to the regular attaching position (see FIG. 11).

Consequently, even if the structure of the inner panel 102 is not changed, during building-up, the upper portion of the window regulator rail 105 and/or the upper portion of the carrier plate 113 does not interfere with the belt portion 102d located at the upper edge of the opening portion 112 of the inner panel 102. Thus, smooth build-up performance can be ensured, and the degree of freedom in designing the carrier plate 113 can be increased.

With the carrier plate 113 being attached to the opening portion 112, the upper end of the carrier plate 113 (see the upper end of the upper trim portion 115 in this embodiment) and the upper end of the window regulator rail 105 are located above the lower end of the belt portion 102d.

With this arrangement, as the upper end of the carrier plate 113 and the upper end of the window regulator rail 105 are located above the lower end of the belt portion 102d, the build-up performance may be degraded normally. However, since the window regulator rail 105 is shifted from the temporary fixing position (see FIG. 14) described above to the proper attaching position (see FIG. 11), good build-up performance can be ensured.

With the carrier plate 113 being attached to the opening portion 112 and the window regulator rail 105 being attached to the proper attaching position (see FIG. 11), the gap L1 in the vehicle widthwise direction between the upper end of the window regulator rail 105 and the upper end of the carrier plate 113 is set smaller than the thickness L2 in the vehicle widthwise direction of the belt portion 102d between the carrier plate 113 and window regulator rail 105.

With this arrangement, since the gap L1 in the vehicle widthwise direction between the upper end of the window regulator rail 105 and the upper end of the carrier plate 113 is set smaller than the thickness L2 of the belt portion 102d described above, the thickness of the carrier plate 113 and that of the entire door in the vehicle widthwise direction can be made compact. Nevertheless, during building-up, as shown in FIGS. 13 and 14, the window regulator rail 105 is temporarily fixed at the temporary fixing position, so that the gap L3 in the vehicle widthwise direction between the upper end of the window regulator rail 105 and the upper end of the carrier plate 113 can be increased. As a result, good build-up performance can be ensured.

The automobile door structure of this embodiment is an automobile door structure which is formed by joining the outer panel 101 and inner panel 102 to each other. The inner panel 102 includes the inner panel front side portion 102b which forms its front side, the inner panel rear side portion 102c which forms its rear side, and the opening portion 112 formed between the inner panel front side portion 102b and inner panel rear side portion 102c. The resin-made carrier plate 113, on which the window regulator rail 105 that allows vertical movement of the window glass panel 110 is built in advance, is attached to cover the opening portion 112. The window regulator rail 105 is temporarily fixed (see FIGS. 13 and 14) to the carrier plate 113 to be separate from the proper attaching position (see FIG. 11). The carrier plate 113 is inserted in the opening portion 112 from below such that the upper edge of the opening portion 112 is positioned between the upper portion of the carrier plate 113 and the upper portion of the window regulator rail 105. After that, the window regulator rail 105 is attached to the proper attaching position (see FIG. 11).

With this arrangement, the window regulator rail 105 is built on the carrier plate 113 in advance. The window regulator rail 105 is temporarily fixed to the carrier plate 113 such that it is separate from the proper attaching position. During temporary fixing, the gap L3 in the vehicle widthwise direction between the upper end of the window regulator rail 105 and the upper end of the carrier plate 113 is set large.

The carrier plate 113 is attached to the opening portion 112 by inserting from below such that the upper edge of the opening portion 112 of the inner panel 102 is positioned between the upper portion of the carrier plate 113 and the upper portion of the window regulator rail 105. After that, the window regulator rail 105 is shifted from the temporary fixing position shown in FIG. 14 and attached to the proper attaching position shown in FIG. 11.

Consequently, even if the structure of the inner panel 102 is not changed, during building-up, the upper portion of the window regulator rail 105 and/or the upper portion of the carrier plate 113 does not interfere with the upper edge of the opening portion 112 of the inner panel 102. Thus, smooth build-up performance can be ensured, and the degree of freedom in designing the carrier plate 113 can be increased.

With the carrier plate 113 being attached to the inner panel 102 (see FIG. 11), the upper end of the carrier plate 113 and the upper end of the window regulator rail 105 are located above the upper edge of the opening portion 112.

With this arrangement, as the upper end of the carrier plate 113 and the upper end of the window regulator rail 105 are located above the lower edge of the opening portion 112, the build-up performance may be degraded normally. However, since the window regulator rail 105 is shifted from the temporary fixing position (see FIG. 14) described above to the proper attaching position (see FIG. 11), good build-up performance can be ensured.

With the carrier plate 113 being attached to the inner panel 102 and the window regulator rail 105 being attached to the regular attaching position (see FIG. 11), the gap L1 in the vehicle widthwise direction between the upper end of the window regulator rail 105 and the upper end of the carrier plate 113 is set smaller than the thickness L2 in the vehicle widthwise direction of the upper edge of the opening portion 112 between the carrier plate 113 and window regulator rail 105.

With this arrangement, since the gap L1 in the vehicle widthwise direction between the upper end of the window regulator rail 105 and the upper end of the carrier plate 113 is set smaller than the thickness L2 of the upper edge of the opening portion 112 described above, the thickness of the carrier plate 113 and that of the entire door in the vehicle widthwise direction can be made compact. Nevertheless, during building-up, the window regulator rail 105 is temporarily fixed at the temporary fixing position, so that the gap L3 in the vehicle widthwise direction between the upper end of the window regulator rail 105 and the upper end of the carrier plate 113 can be increased. As a result, good build-up performance can be ensured.

The window regulator rail 105 is provided with the attaching members (see the stud bolts 119 and 120) projecting toward the carrier plate 113. The carrier plate 113 is provided with the support portions 113a and 113b which can support the attaching members and can hold the window regulator rail 105 at the temporary fixing position and proper attaching position.

With this arrangement, the window regulator rail 105 can be held at the temporary fixing position (see FIGS. 13 and 14) and the proper attaching position (see FIG. 11) with a simple arrangement including the attaching members (see the stud bolts 119 and 120) of the window regulator rail 105 side and the support portions 113a and 113b of the carrier plate 113 side.

Also, the carrier plate 113 is provided with the fastening members (see the nuts 121 and 122) which are fastened on the attaching members (see the stud bolts 119 and 120) of the window regulator rail 105 from the vehicle compartment side, so the window regulator rail 105 is shifted from the temporary fixing position to the proper attaching position.

With this arrangement, the window regulator rail 105 can be easily shifted from the temporary fixing position to the proper attaching position with the simple manipulation of the fastening members (see the nuts 121 and 122) from the vehicle compartment side.

In addition, the upper trim portion 115 extends on the upper portion of the carrier plate 113, and the trim plate 125 which covers the vehicle compartment side except the upper trim portion 115 can be attached to the carrier plate 113.

With this arrangement, since the upper trim portion 115 is provided to the carrier plate 113, the expensive trim plate 125 can be made compact, so that cost reduction can be achieved. Since the trim plate 125 is made compact, it can be molded easily, attached easily, and handled easily.

The trim skin 123 is integrally molded on the upper trim portion 115.

With this arrangement, since the trim skin 123 is integrally molded on the upper trim portion 115, the appearance and design can be improved.

The draining inner member (see the draining inner seal 124) for the window glass panel 110 is integrally formed on the upper trim portion 115.

This arrangement can eliminate the additional step of attaching to the carrier plate 113 a draining inner member (see the draining inner seal 124) which drains water attaching to the window glass panel 110 when the window glass panel 110 is vertically moved. Thus, the productivity can be improved.

Figure 18:
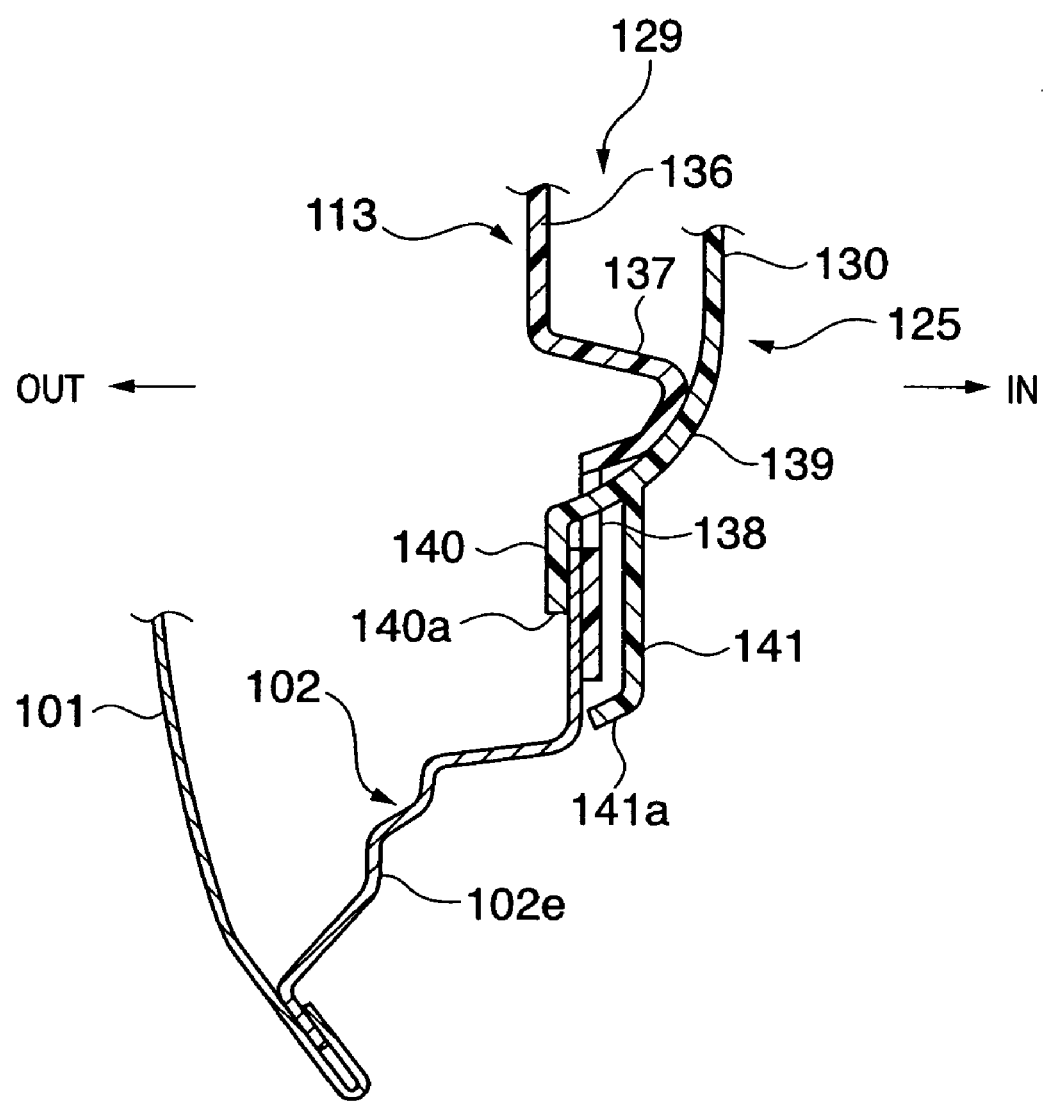
FIG. 18 is a sectional view showing another example of an engaging structure including engaging pawls.

FIG. 18 shows another example of the engaging structure including the engaging pawls 140 and 141. In the embodiment shown in FIG. 17, the engaging pawl 140 is secured by only the open edge portion of the engaging hole 138 of the carrier plate 113. In the example shown in FIG. 18, the engaging pawl 140 is secured by both the open edge portion of the engaging hole 138 of the carrier plate 113 and the upper end of the inner panel lower side portion 102e of the inner panel 102 (that is, the lower edge of the opening portion 112).

With this arrangement, the support rigidity of the trim plate 125 can be improved. Particularly, the support strength of the trim plate 125 when the door is closed can be improved.

Other arrangements, function, and effect of the example shown in FIG. 18 are the same as those of the embodiment described above. Thus, those portions of FIG. 18 which are identical to those of FIG. 17 are denoted by the same reference numerals, and a detailed description thereof will be omitted.

Figure 19:
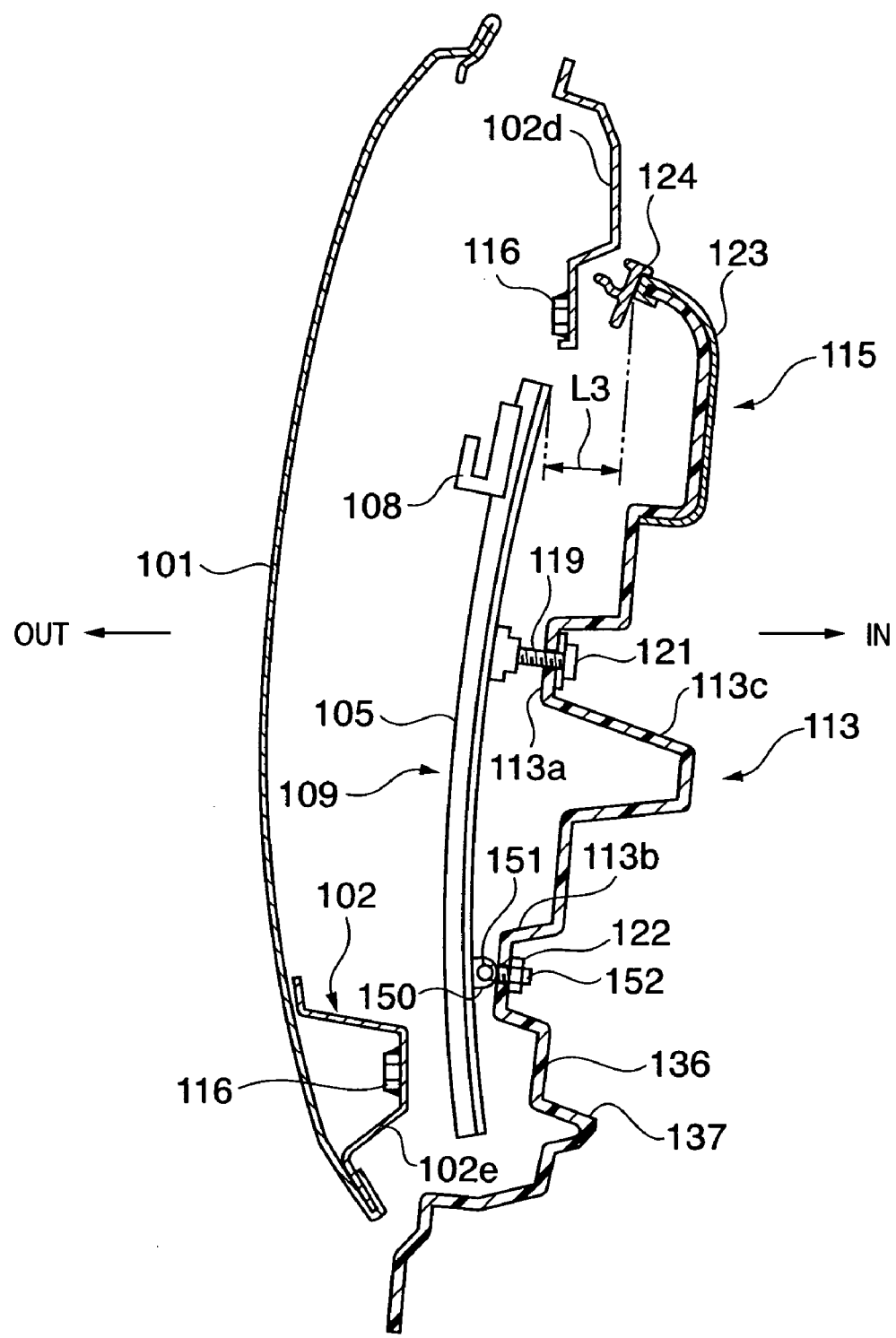
FIG. 19 is a sectional view of a state before building-up showing another example of the second embodiment of the present invention.
Figure 20:
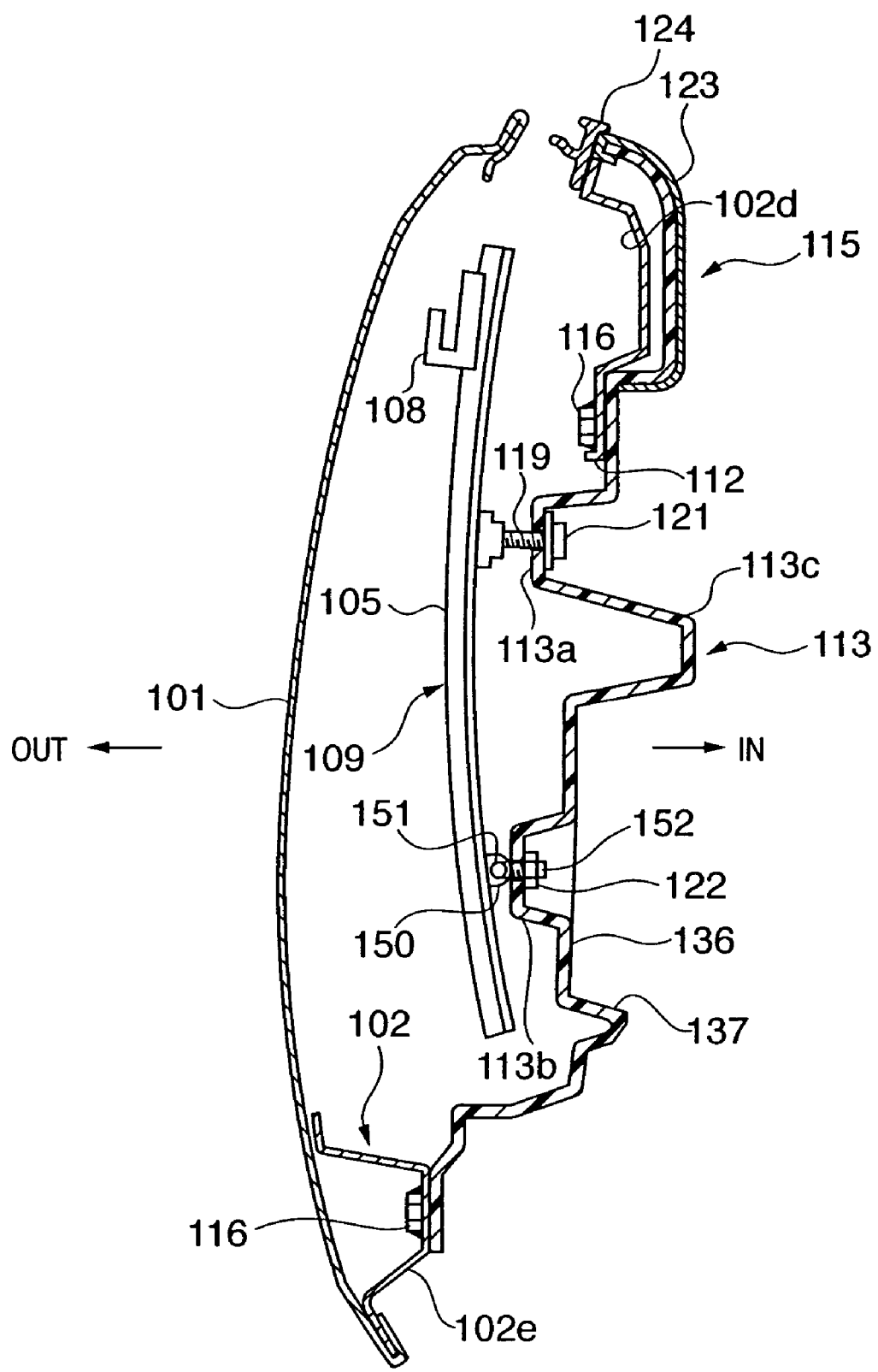
FIG. 20 is a sectional view showing a state wherein the window regulator rail is temporarily fixed.
Figure 21:
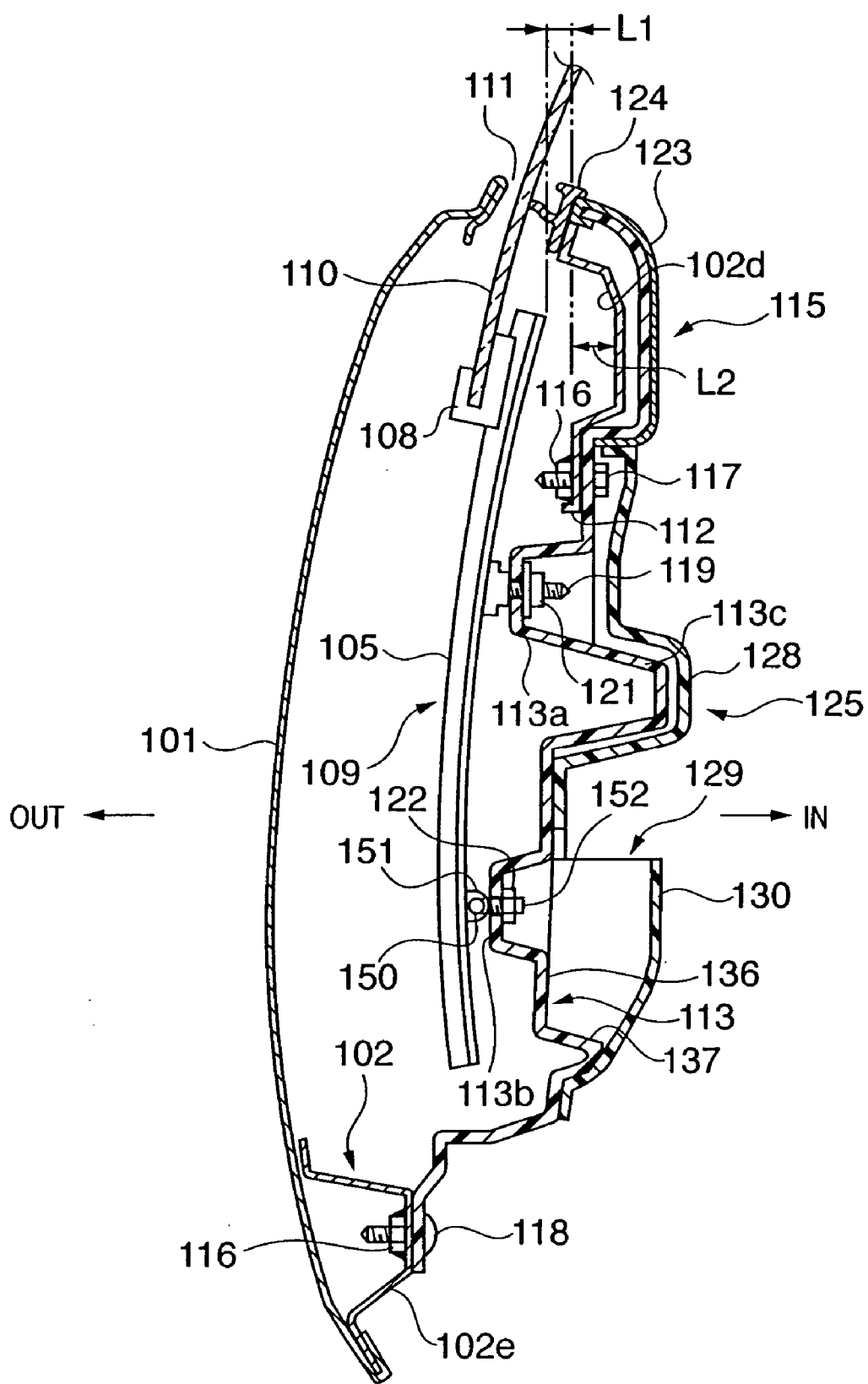
FIG. 21 is a sectional view showing a state wherein building-up is completed.

FIGS. 19, 20, and 21 show another example of the automobile door structure according to the second embodiment. In this example, the lower attaching structure of the window regulator rail 105 has the following arrangement.

More specifically, a bearing bracket 150 is fixed to that portion of the window regulator rail 105 which opposes the lower support portion 113b of the carrier plate 113. A bolt 152 is integrally formed with a support shaft 151 pivotally supported by the bearing bracket 150. The nut 122 described above is fastened on the projecting portion of the bolt 152 extending from the support portion 113b to the vehicle compartment side.

With this arrangement, the lower portion of the window regulator rail 105 can be positioned at and fixed to the regular attaching position in advance, and only the upper portion of the window regulator rail 105 needs to be shifted from the temporary fixing position (see FIGS. 19 and 20) to the proper attaching position (see FIG. 21). Thus, the insertion hole for the bolt 152 need not be a loose-fit hole, so that positioning of the window regulator rail 105 is facilitated.

With this arrangement, as shown in FIG. 19, the carrier plate 113 which is at the gap L3 from the upper end of the window regulator rail 105 is inserted in the opening portion 112 from below and is set in the state of FIG. 20. After the carrier plate 113 is fixed to the periphery of the opening portion 112, the upper nut 121 is completely fastened from the vehicle compartment side. Thus, the window regulator rail 105 can be attached to the proper attaching position, as shown in FIG. 21.

Other arrangements, function, and effect of the example shown in FIGS. 19 to 21 are the same as those of the embodiment described above. Thus, those portions of FIGS. 19 to 21 which are identical to those of FIG. 17 are denoted by the same reference numerals, and a detailed description thereof will be omitted.

Figure 22:
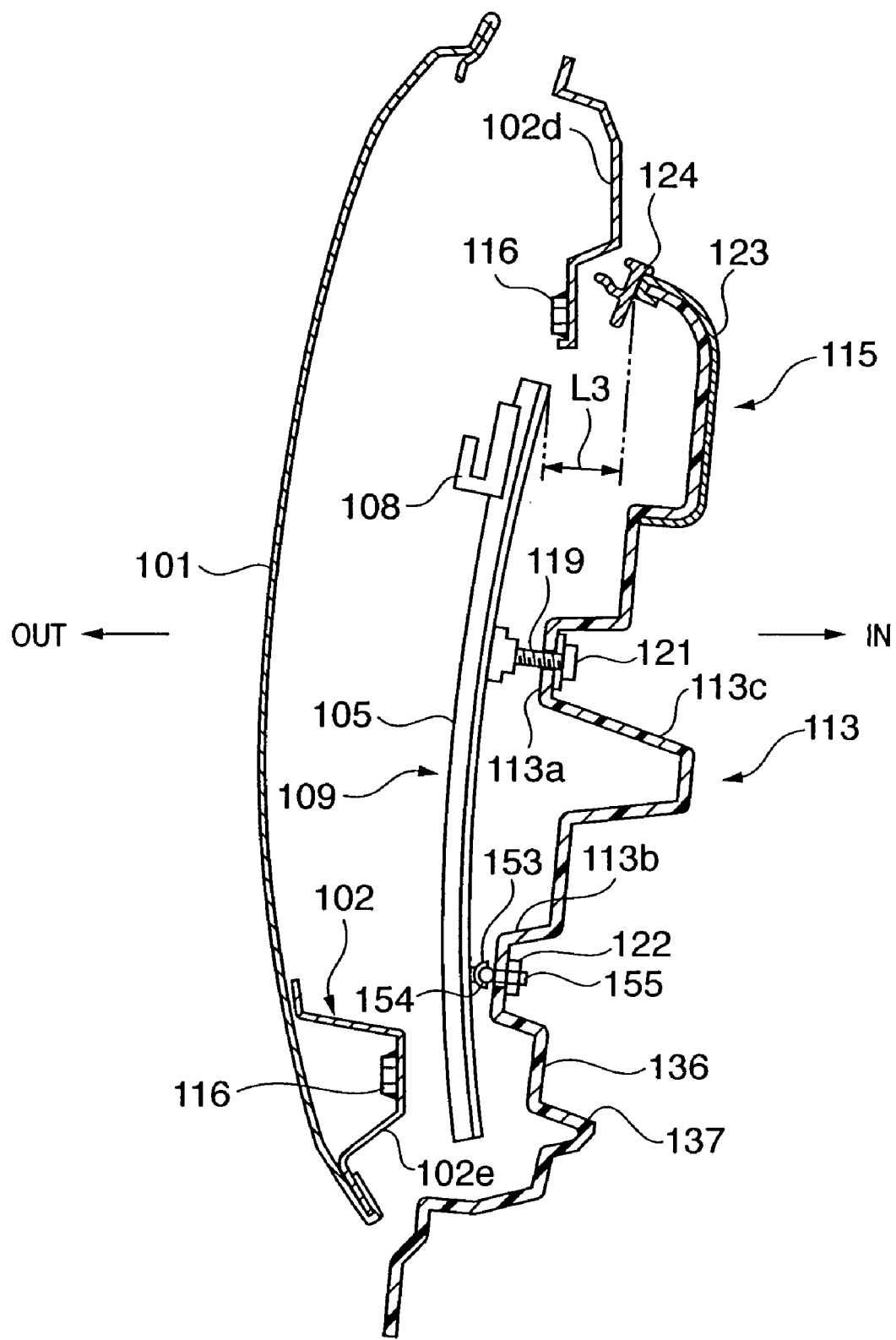
FIG. 22 is a sectional view of a state before building-up showing still another example of the second embodiment.
Figure 23:
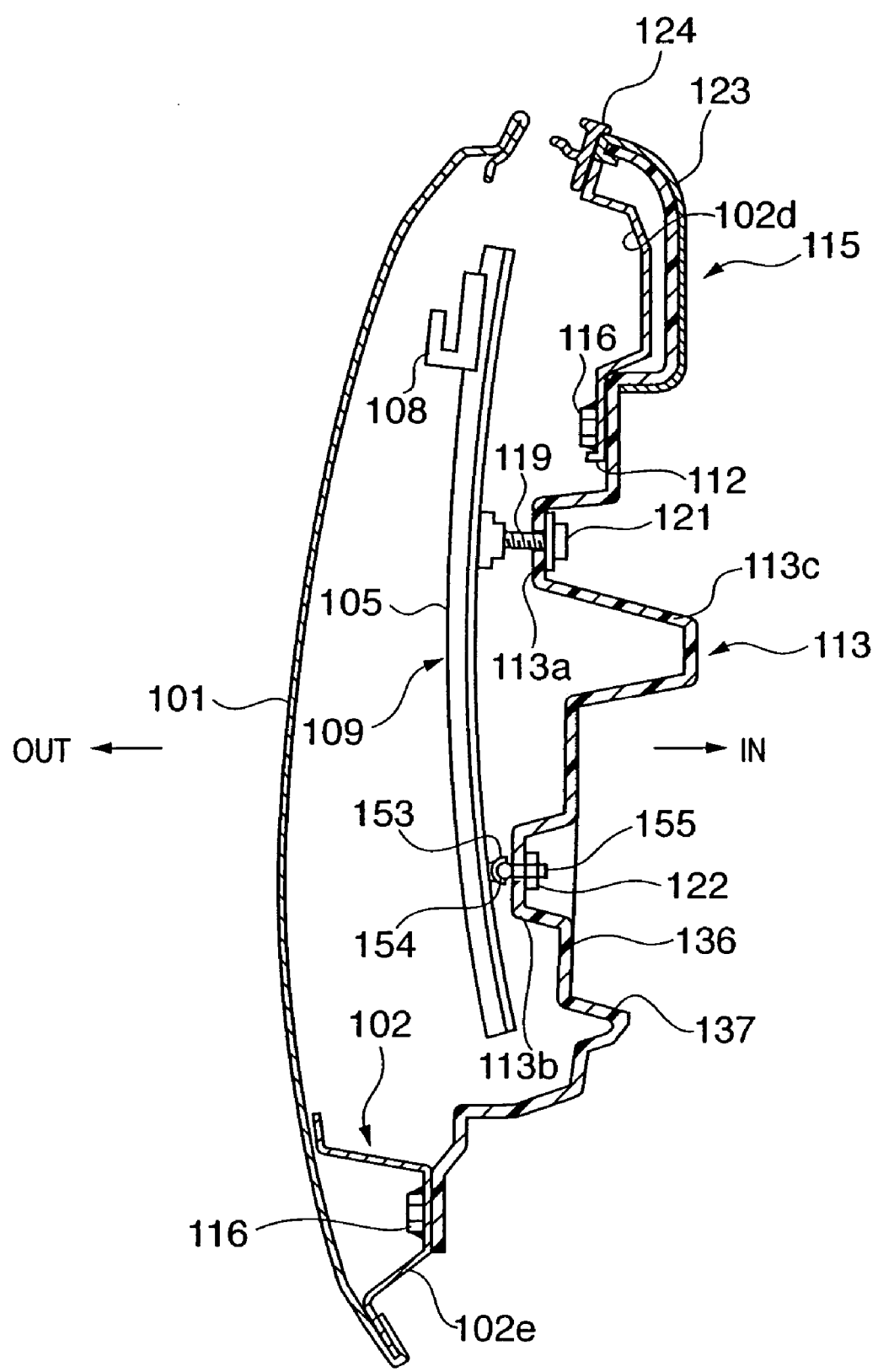
FIG. 23 is a sectional view showing a state wherein the window regulator rail is temporarily fixed.
Figure 24:
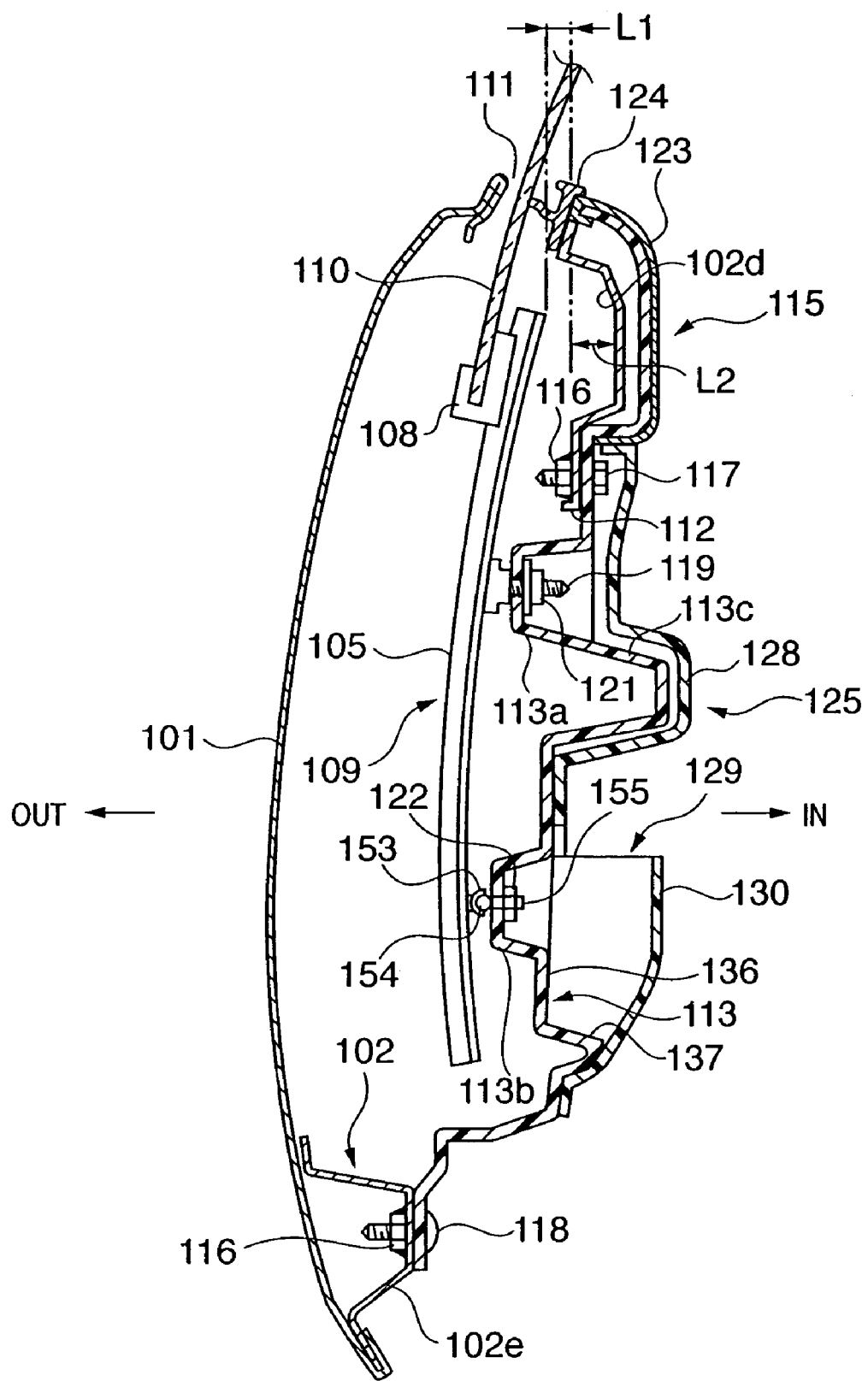
FIG. 24 is a sectional view showing a state wherein building-up is completed.

FIGS. 22, 23, and 24 show still another example of the automobile door structure according to the second embodiment. In this example, the lower attaching structure of the window regulator rail 105 has the following arrangement.

More specifically, a spherical bearing 153 is fixed to that portion of the window regulator rail 105 which opposes the lower support portion 113b of the carrier plate 113. A bolt 155 is integrally formed with a ball 154 supported by the spherical bearing 153 in a spherical joint manner. The nut 122 described above is fastened on the projecting portion of the bolt 155 extending from the support portion 113b to the vehicle compartment side.

With this arrangement, the lower portion of the window regulator rail 105 can be positioned at and fixed to the proper attaching position in advance, and only the upper portion of the window regulator rail 105 needs to be shifted from the temporary fixing position (see FIGS. 22 and 23) to the proper attaching position (see FIG. 24). Thus, the insertion hole for the bolt 155 need not be a loose-fit hole, so that positioning of the window regulator rail 105 is facilitated.

With this arrangement, as shown in FIG. 22, the carrier plate 113 which is at the gap L3 from the upper end of the window regulator rail 105 is inserted in the opening portion 112 from below and is set in the state of FIG. 23. After the carrier plate 113 is fixed to the periphery of the opening portion 112, the upper nut 121 is completely fastened from the vehicle compartment side. Thus, the window regulator rail 105 can be attached to the proper attaching position, as shown in FIG. 24.

Other arrangements, function, and effect of the example shown in FIGS. 22 to 24 are the same as those of the embodiment described above. Thus, those portions of FIGS. 22 to 24 which are identical to those of FIG. 17 are denoted by the same reference numerals, and a detailed description thereof will be omitted.

<Third Embodiment>

The third embodiment of the present invention will be described in detail with reference to the accompanying drawings.

Figure 25:
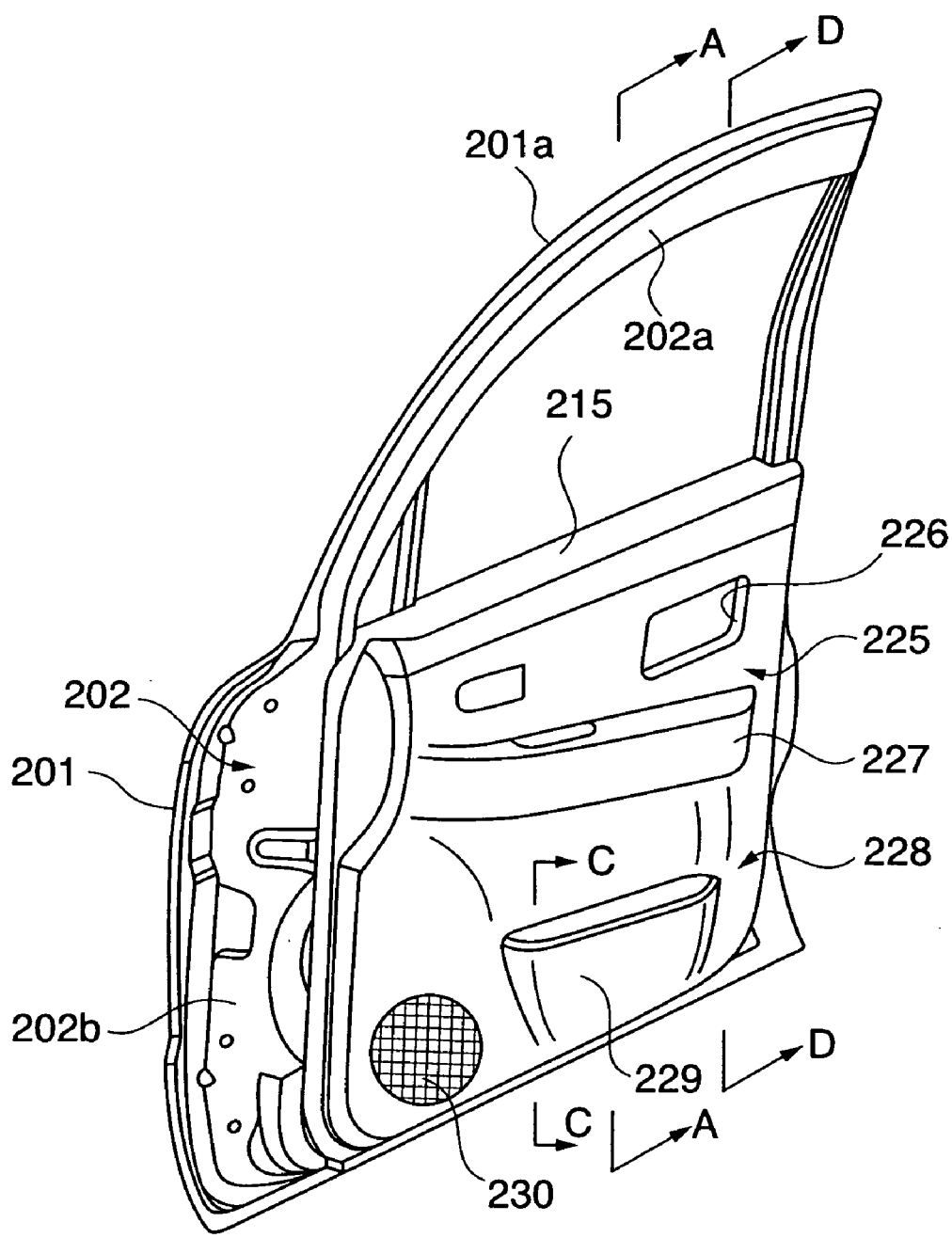
FIG. 25 is a perspective view showing an automobile door structure according to the third embodiment of the present invention.
Figure 26:
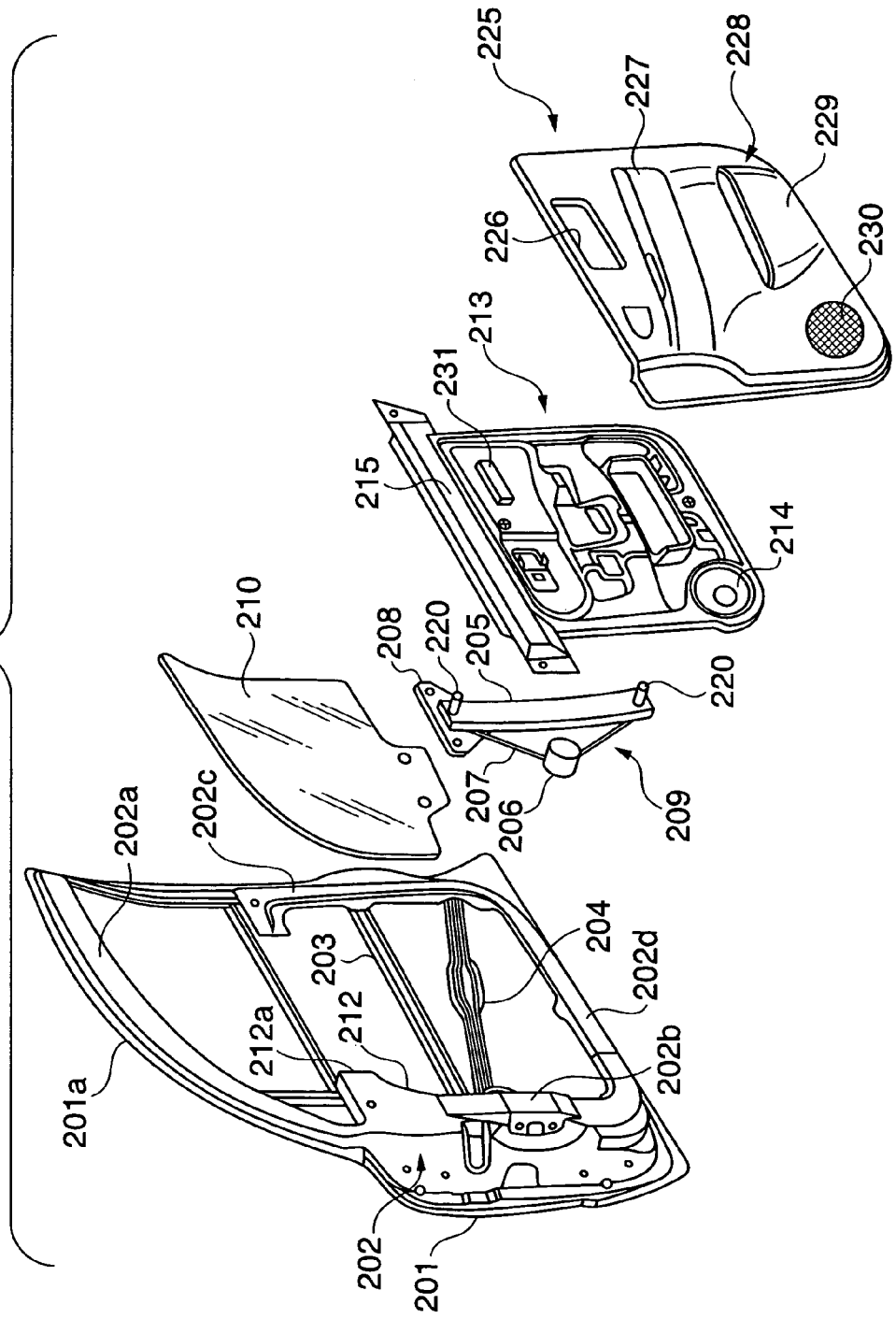
FIG. 26 is an exploded perspective view of FIG. 25.
Figure 27:
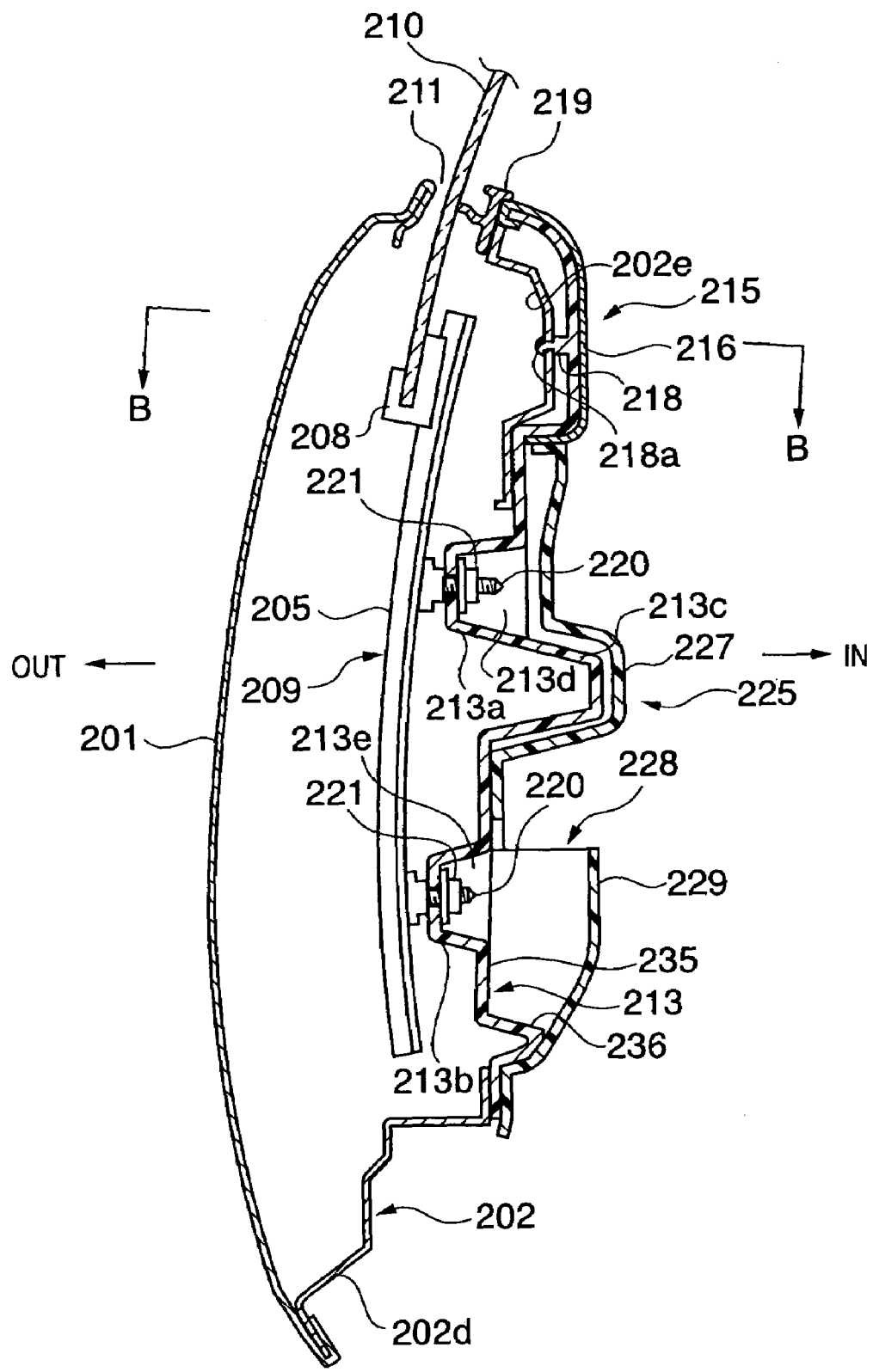
FIG. 27 is an enlarged sectional view of the main part taken along the line A—A of FIG. 25.
Figure 28:
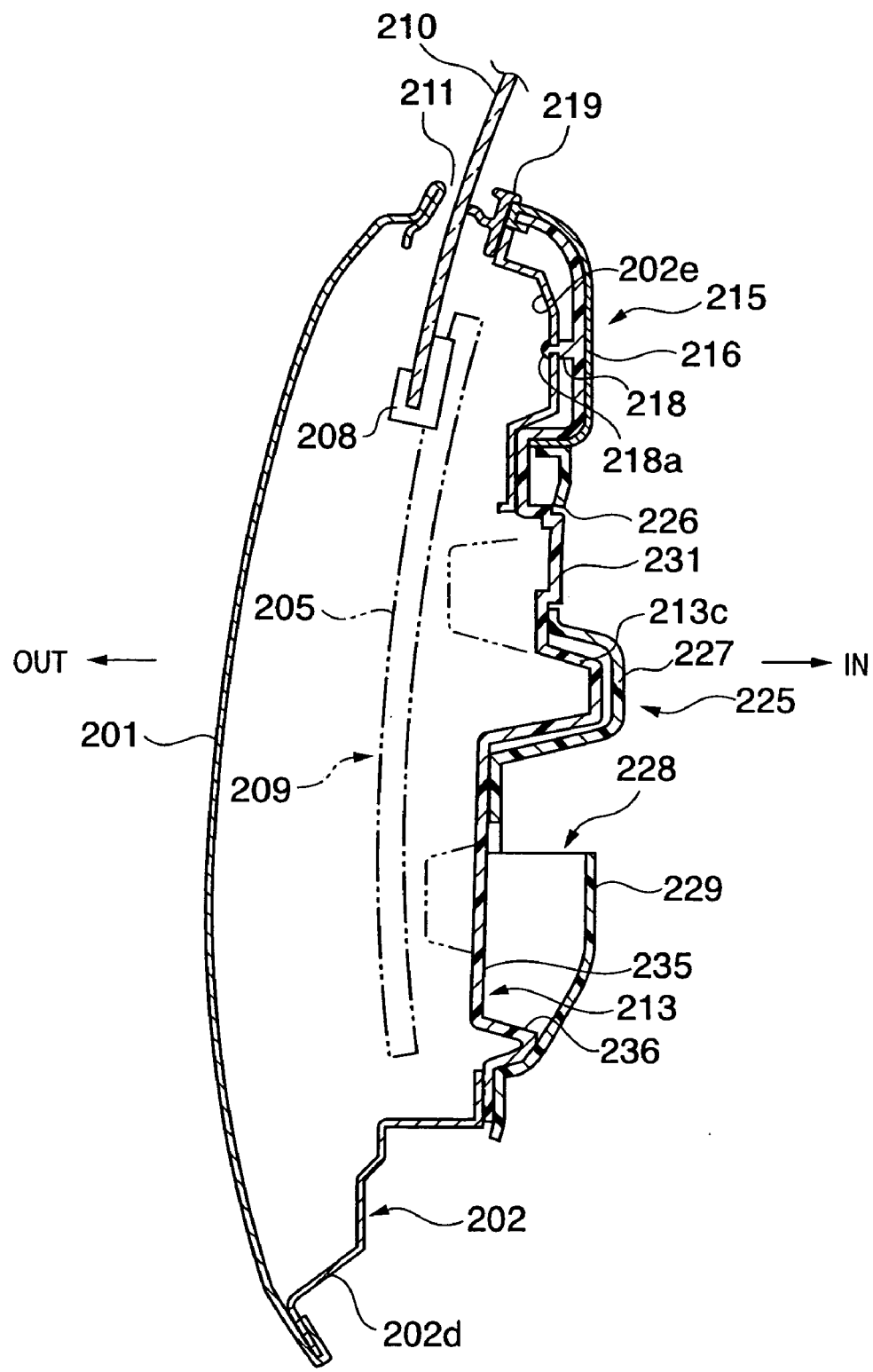
FIG. 28 is an enlarged sectional view of the main part taken along the line D—D of FIG. 25.

FIG. 25 is a perspective view showing an automobile door structure according to this embodiment, FIG. 26 is an exploded perspective view of the same, FIG. 27 is a sectional view of the main part taken along the line A—A of FIG. 25, and FIG. 28 is a sectional view of the main part taken along the line D—D of FIG. 25. Referring to FIGS. 25 to 28, the automobile door structure is formed by bonding an outer panel 201 and inner panel 202.

The outer panel 201 and inner panel 202 include door main body portions and sash portions 201a and 202a, respectively. Although this embodiment exemplifies a front door having the sash portions 201a and 202a, the automobile door structure of this embodiment can also be applied to a sash-less front door or rear door.

As shown in FIG. 26, impact bars 203 and 204 extend through the space in the door in the back-and-forth direction of the vehicle, to ensure rigidity against side collision. More specifically, the upper and lower impact bars 203 and 204 are joined and fixed to predetermined portions of the inner panel 202.

As shown in FIGS. 26 and 27, a window regulator 209 including a regulator rail 205, motor 206, wire 207, and slider 208 is disposed in the space in the door. The slider 208 of the window regulator 209 vertically moves a window glass panel 110.

The window glass panel 210 is moved in the vertical direction through an opening 211 for vertical movement of the window glass panel which is formed in the upper end of the door main body portion. A weather strip or draining inner seal (not shown) is attached to the upper end portion of the outer panel 201 corresponding to the opening 211.

The inner panel 202 is formed of a metal plate such as a steel plate. As shown in FIG. 26, the door main body portion of the inner panel 202 includes an inner panel front side portion 202b which forms the front side of the inner panel 202 and is connected to the vehicle body through a hinge (more specifically, a hinge member including a door-side hinge bracket, hinge pin, and body-side hinge bracket), an inner panel rear side portion 202c which forms its rear side, and an inner panel lower side portion 202d which forms its lower side. An opening portion 212 is formed in the inner panel 202 to leave the side portions 202b, 202c, and 202d.

As shown in FIG. 26, at substantially the height of the belt line between the upper portion of the inner panel front side portion 202b and the upper portion of the inner panel rear side portion 202c, a portion between the upper portions of the side portions 202b and 202c is notched to communicate with the opening portion 212, thus forming a notched portion 212a.

A resin-made carrier plate 213 can be attached to a portion surrounded by the three sides, i.e., the inner panel front side portion 202b, inner panel rear side portion 202c, and inner panel lower side portion 202d, to cover the opening portion 212 of the inner panel 202. The carrier plate 213 is made of a resin such as FRP (Fiber-Reinforced Plastic such as glass, carbon, stainless steel, or the like), and supports the window regulator 209 and a loudspeaker 214 as the accessories (door function components) of the door.

As shown in FIGS. 27 and 28, the carrier plate 213 is integrally molded with window regulator attaching portions 213a and 213b and armrest support portion 213c simultaneously.

In addition, an upper trim portion 215 extending to cover the vehicle compartment side of the notched portion 212a of the inner panel 202 is integrally molded (simultaneous molding) on the upper portion of the carrier plate 213 from the same material such as FRP.

The carrier plate 213 is colored with arbitrary hue in advance. A trim skin 216 is molded on the upper trim portion 215 on the carrier plate 213 simultaneously. As the material to form the trim skin 216, PVC (PolyVinyl Chloride) or the like can be used.

In addition, as shown in FIG. 27, that surface of the upper trim portion 215 on the carrier plate 213 which is on the door main body side is integrally formed with a belt portion 202e which extends substantially at the height of the belt line between the inner panel front side portion 202b and inner panel rear side portion 202c.

The belt portion 202e is formed of a metal plate such as a steel plate which is of the same type as that of the inner panel 202, and is attached to the notched portion 212a.

Figure 29:
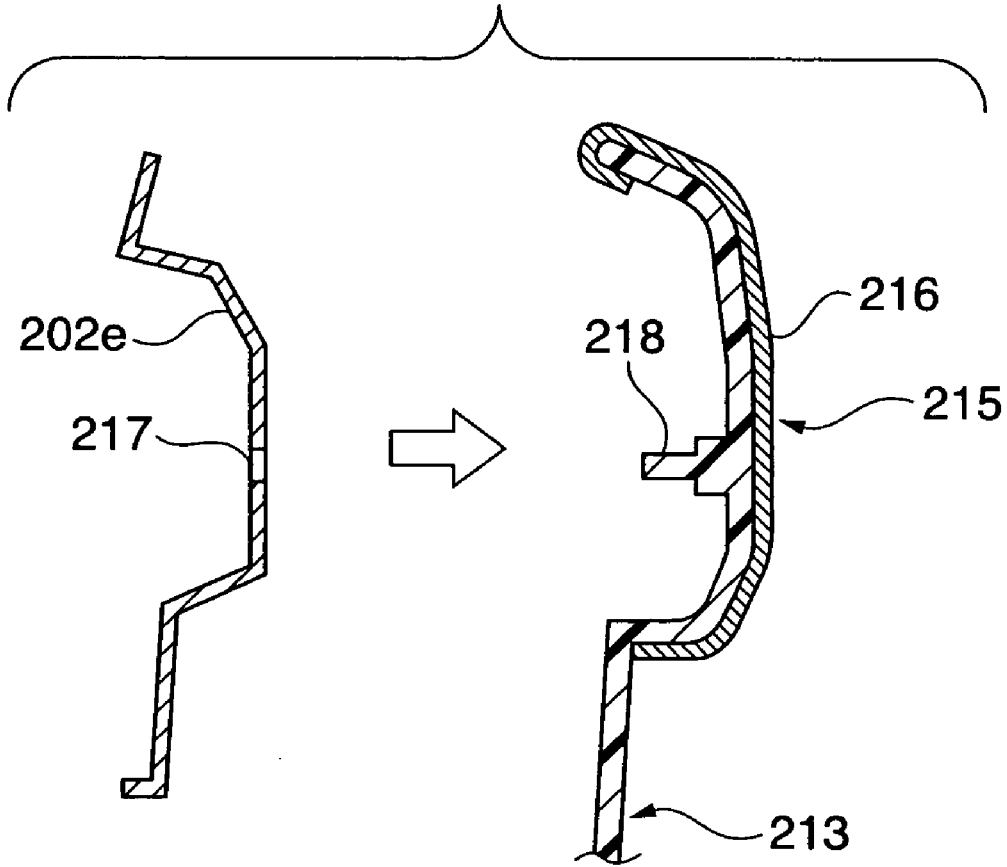
FIG. 29 is an exploded sectional view showing a state before a belt is attached.

The upper trim portion 215 of the carrier plate 213 is connected to the belt portion 202e by welding. More specifically, as shown in FIG. 29, the belt portion 202e has a hole portion 217 to correspond to the connecting portion. The upper trim portion 215 is integrally molded with a projection 218 which projects toward the belt portion 202e to correspond to the hole portion 217.

Figure 30:
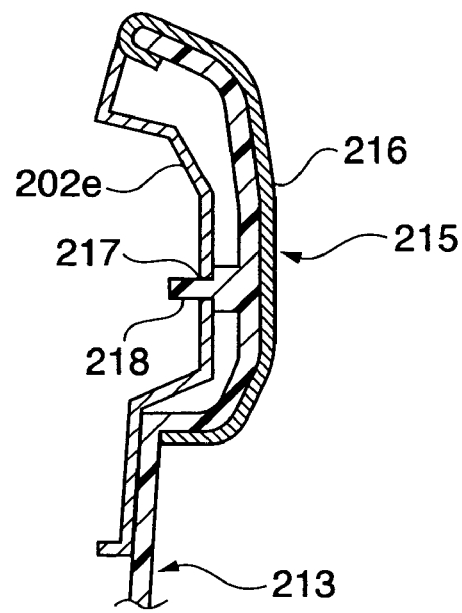
FIG. 30 is a sectional view showing a state wherein the belt is attached.
Figure 31:
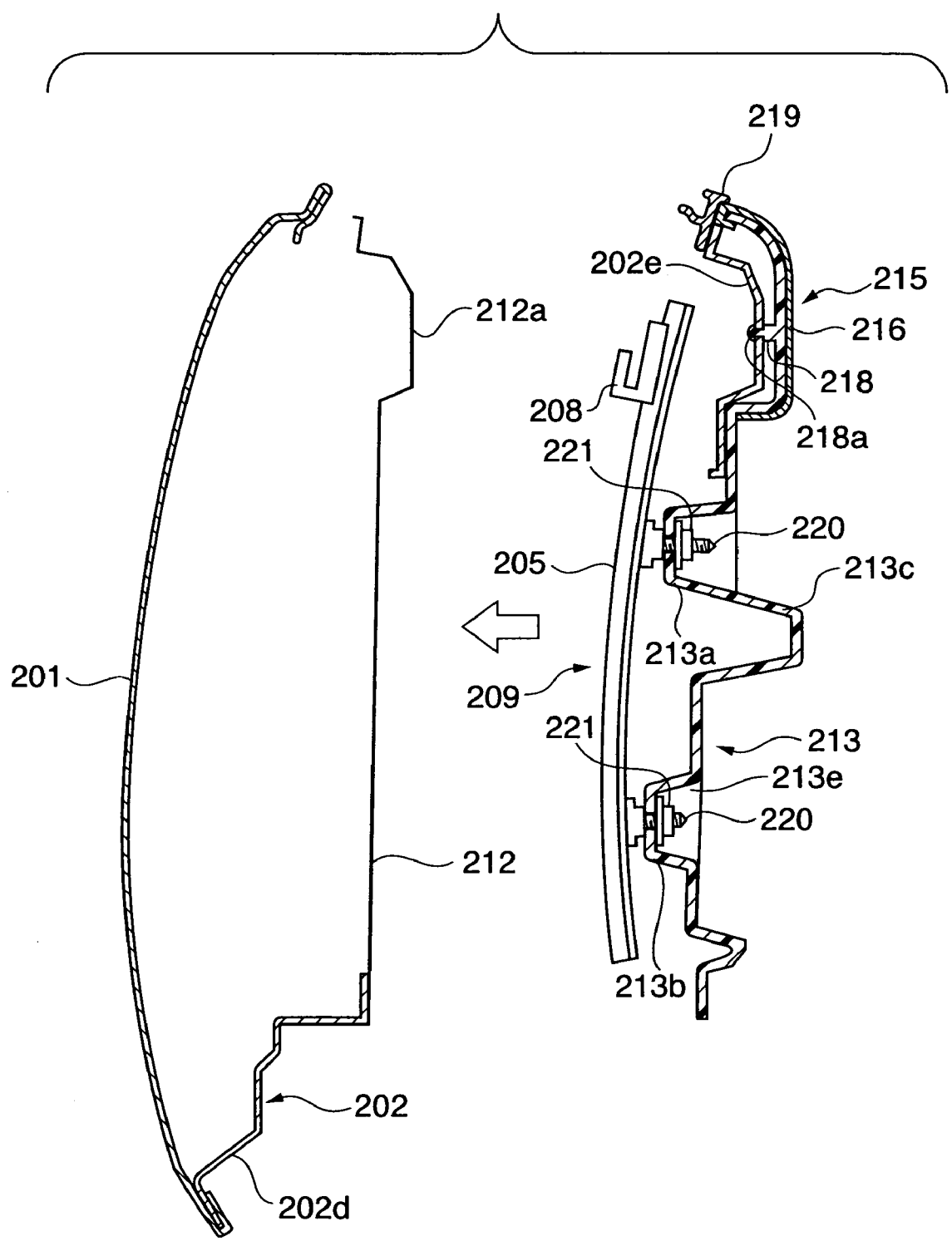
FIG. 31 is an exploded sectional view showing a state before a carrier plate is attached.

The projection 218 has a two-stage shaft structure including a large-diameter proximal end portion and small-diameter distal end portion. The small-diameter distal end portion of the projection 218 is inserted in the hole portion 217 of the belt portion 202e to extend through it, as shown in FIG. 30. One end of the projection 218 projecting from the hole portion 217 is heated and welded by a heat caulking means. The upper trim portion 215 of the carrier plate 213 is connected to the belt portion 202e through a heat caulking portion 218a, as shown in FIG. 31. The heat caulking portion 218a includes those formed at a plurality of portions, e.g., two to three portions, in the back-and-forth direction of the vehicle.

As the welding method, for example, hot-plate welding, ultrasonic welding, spin welding, or hot-gas welding is used.

A draining inner seal 219 (draining inner member) which drains water attaching to the window glass panel 210 is integrally formed on the upper end portion of the upper trim portion 215 and that of the belt portion 202e which oppose the window glass panel 210.

Furthermore, as shown in FIG. 31, the window regulator rail 205 of the window regulator 209, which is disposed closer to the outer panel 201 than the inner panel 202 and allows vertical movement of the window glass panel 210, is built on the carrier plate 213 in advance.

In other words, stud bolts 220 are integrally arranged on that surface of the window regulator rail 205 which faces the carrier plate 213 to correspond to the attaching portions 213a and 213b. The stud bolts 220 are built on the attaching portions 213a and 213b of the carrier plate 213 in advance by using nuts 221.

As shown in FIG. 31, the carrier plate 213, to which the belt portion 202e is integrally arranged and on which the window regulator 209 is built in advance, is attached to the periphery of the opening portion 212 of the inner panel 202, as shown in FIGS. 27 and 28.

Figure 32:
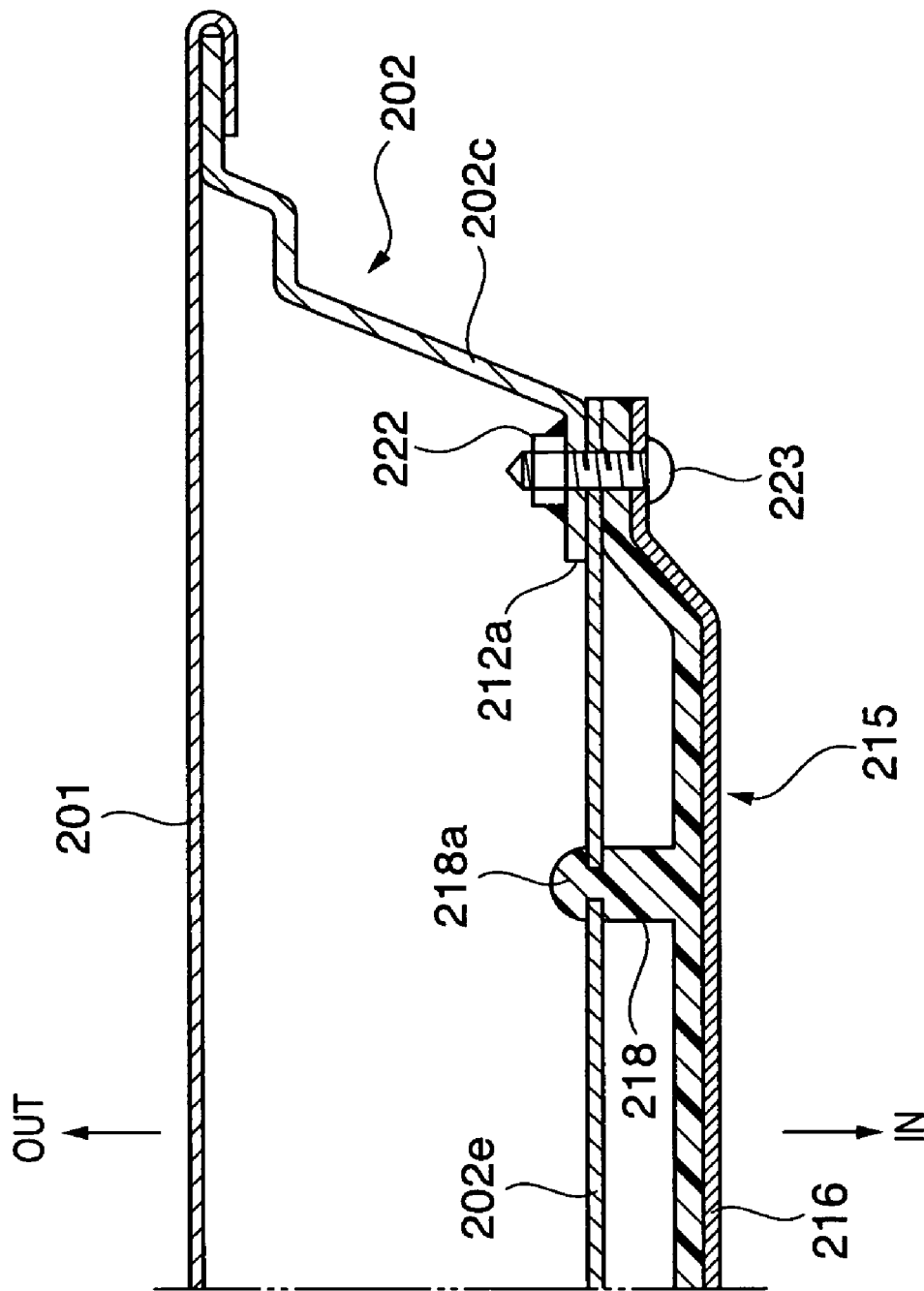
FIG. 32 is an enlarged sectional view of the main part taken along the line B—B of FIG. 27.

FIG. 32 is an enlarged sectional view of the main part taken along the line B—B of FIG. 27. Nuts 222 are welded and fixed in advance to those surfaces of the upper portion of the inner panel front side portion 202b and the upper portion of the inner panel rear side portion 202c (FIG. 32 shows the structure of only the inner panel rear side portion 202c for the illustrative convenience), which are close to the outside of the vehicle, to correspond to the periphery of the notched portion 212a continuous to the opening portion 212 of the inner panel 202. The belt portion 202e and the upper trim portion 215 of the carrier plate 213 are attached to the inner panel 202, and are fastened and fixed simultaneously by using screws 223 that threadably engage with the nuts 222.

Through this attaching and fixing, the belt portion 202e is provided substantially at the height of the belt line so as to connect between the inner panel front side portion 202b with inner panel rear side portion 202c, and is extended between the front and rear side portions 202b and 202c so as to cover the notched portion 212a.

Figure 33:
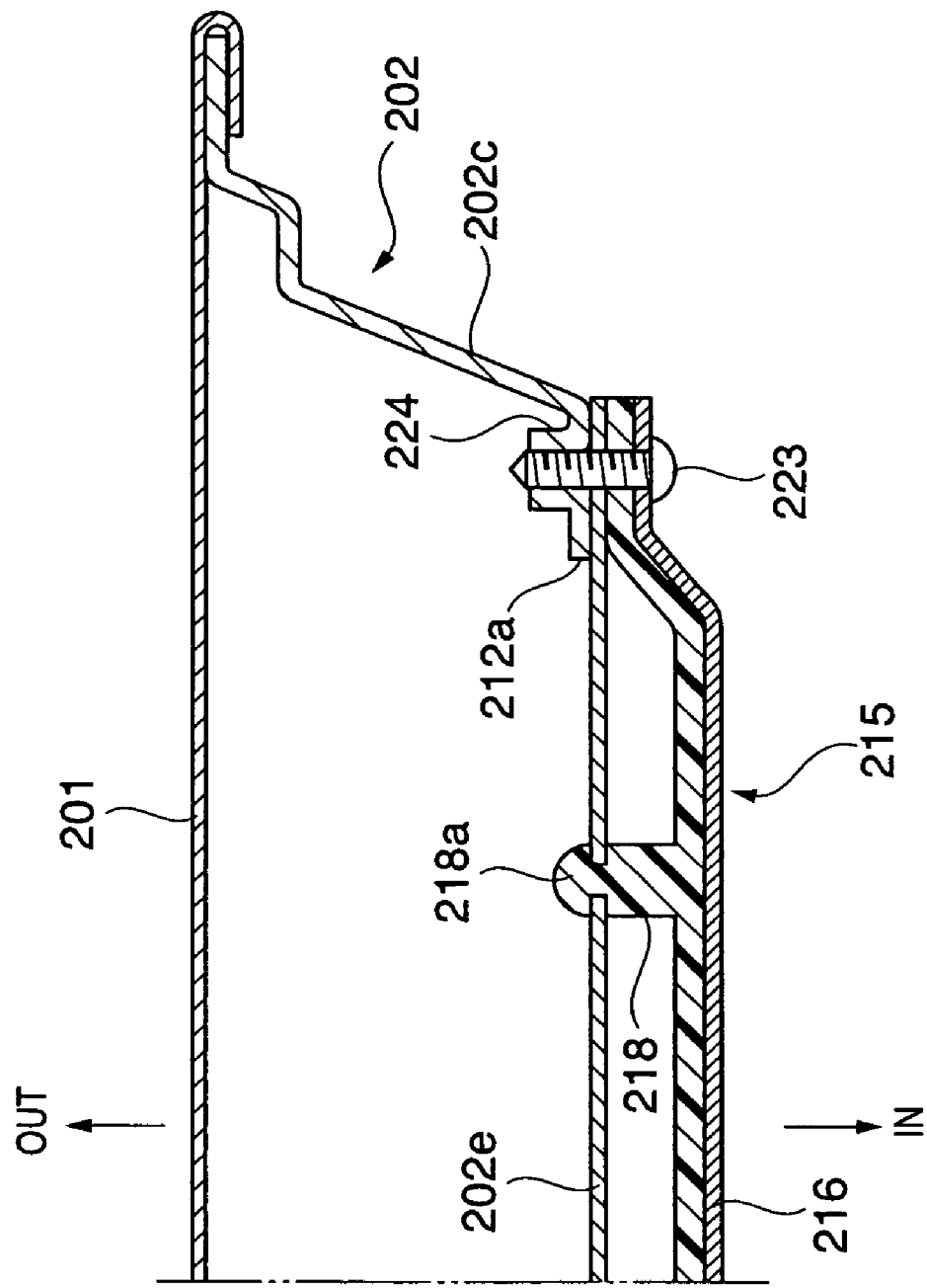
FIG. 33 is a sectional view showing another example of a belt portion attaching structure.

In place of welding and fixing the nuts 222 to the inner panel 202 in advance as shown in FIG. 32, nut portions 224 may be integrally formed by burring at predetermined portions of the inner panel 202, as shown in FIG. 33, so that the number of components decreases.

As shown in FIGS. 27 and 28, a trim plate 225 is attached to that portion of the carrier plate 213 which is below the upper trim portion 215, to cover the vehicle compartment side of the carrier plate 213.

Figure 34:
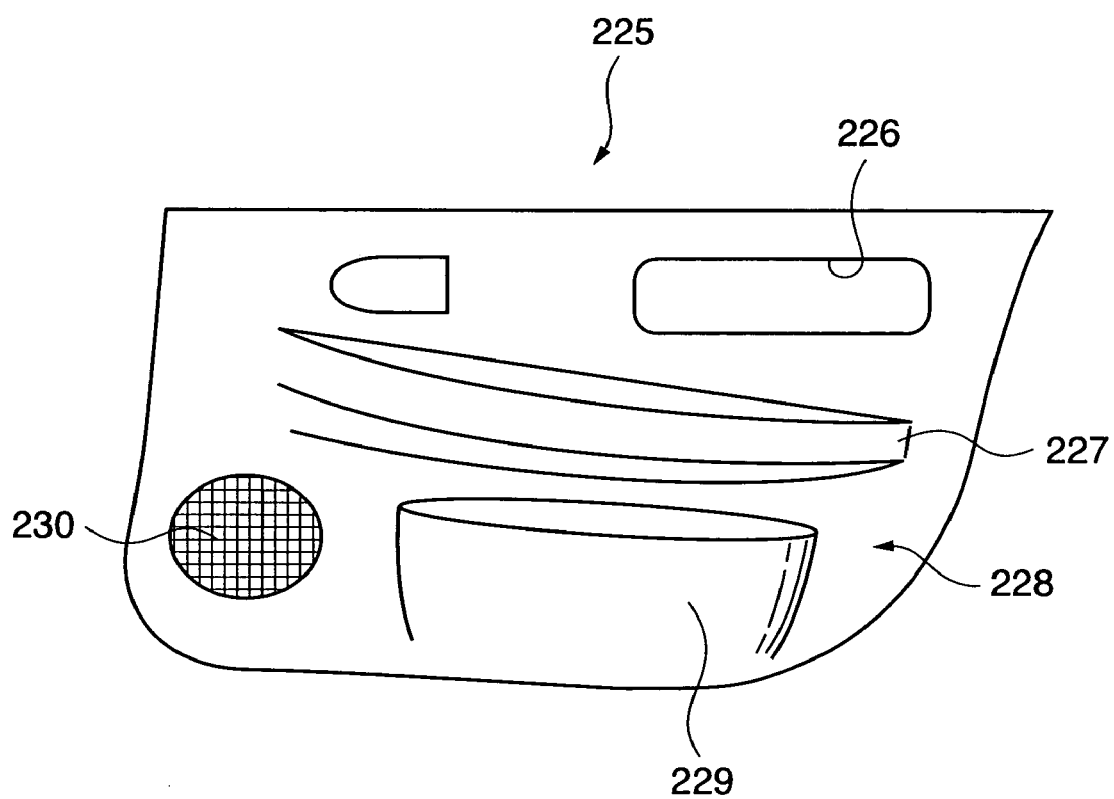
FIG. 34 is a side view of a trim plate.

The trim plate 225 is formed of a decorative laminated sheet. As shown in FIGS. 26, 27, and 34, the trim plate 225 is integrally, simultaneously formed with an opening 226 in its upper portion, an armrest portion 227 at its intermediate portion in the vertical direction, a pocket front surface portion 229 at its lower portion to form a pocket portion 228, and a loudspeaker grille 230 at its lower front portion.

Figure 35:
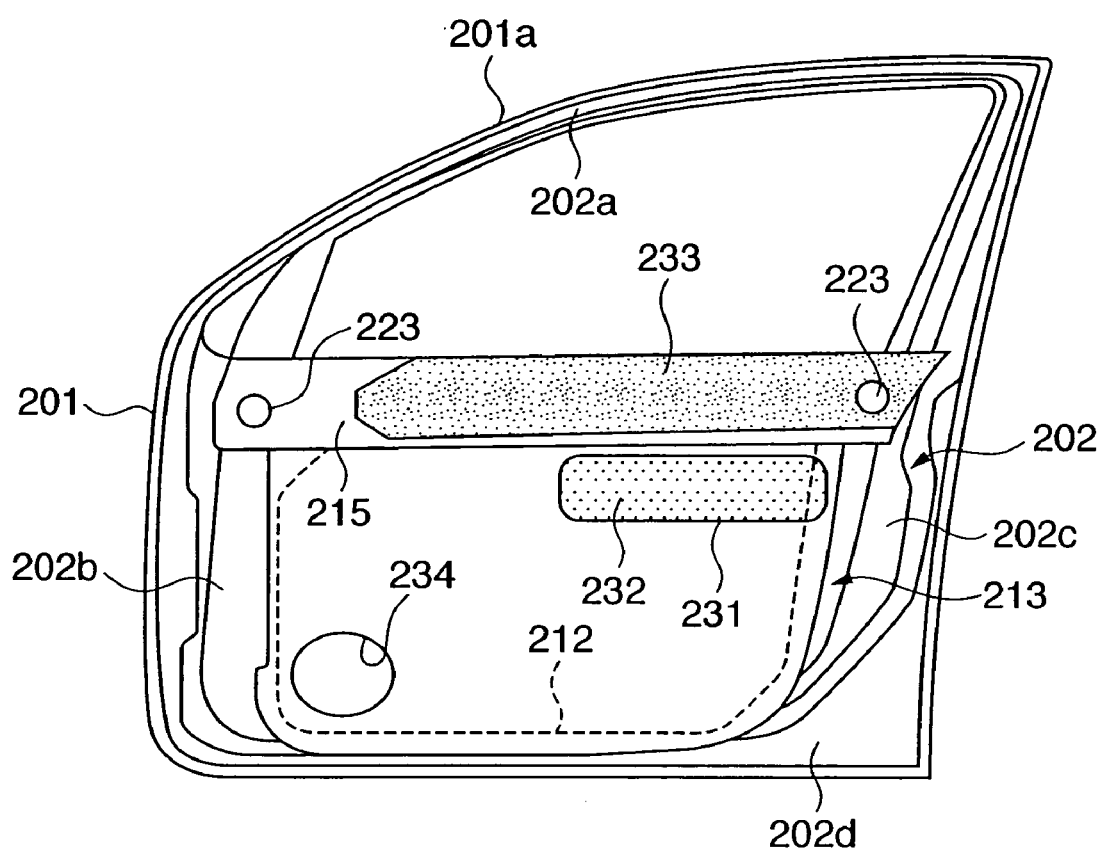
FIG. 35 is a side view of a door to which the carrier plate is attached.

Since the opening 226 is formed in the trim plate 225, an exposed portion 231 which is not covered by the trim plate 225 is formed in the carrier plate 213, as shown in FIGS. 28 and 35.

As shown in FIG. 35, fine uneven embosses 232 are simultaneously molded on the exposed portion 231 which opposes the opening 226. On the upper trim portion 215, a cloth portion 233 (so-called fabric portion) is bonded and fixed to the vehicle compartment side of the trim skin 216 (see FIG. 27) to improve the design. In place of the cloth portion 233, a leather portion may be formed. In FIG. 35, the embosses 232 and cloth portion 233 are indicated by dots for the illustrative convenience. In FIG. 35, reference numeral 234 denotes a hole portion (loudspeaker attaching hole) to attach the loudspeaker 214 therein.

Figure 36:
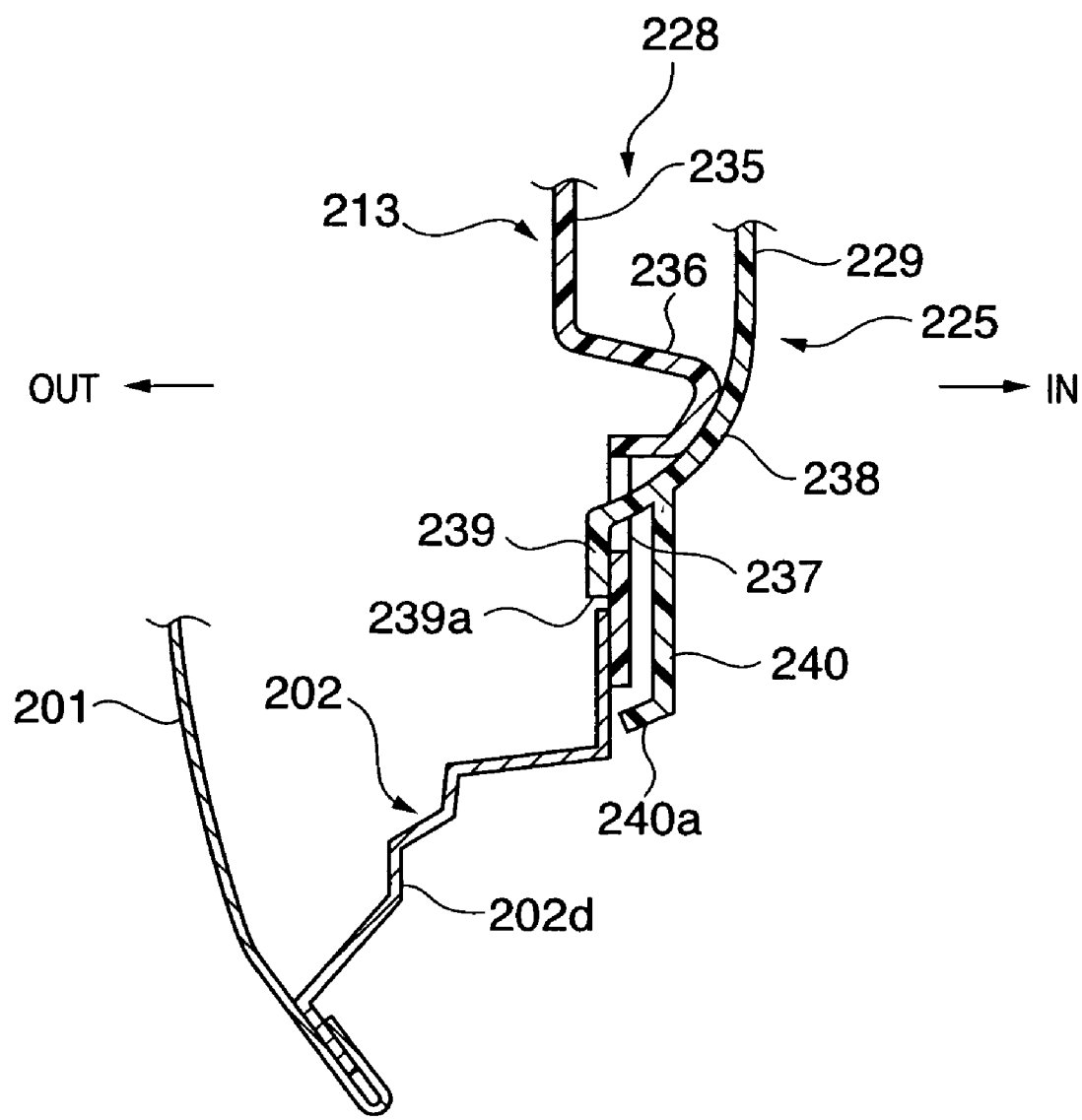
FIG. 36 is an enlarged sectional view of the main part taken along the line C—C of FIG. 25.

As the pocket front surface portion 239 which forms the pocket portion 228 is formed on the lower portion of the trim plate 225 described above, a pocket rear surface portion 235 is formed on the corresponding portion of the carrier plate 213 which opposes the pocket front surface portion 229, as shown in FIGS. 27, 28, and 36. The two members, i.e., the trim plate 225 and carrier plate 213, form the pocket portion 228 described above.

According to this embodiment, the lower portion of the pocket rear surface portion 235 extends toward the pocket front surface portion 229 to form a pocket bottom portion 236 on the carrier plate 213 integrally. As shown in FIG. 36, engaging holes 237 with which the trim plate 225 is engaged are formed at a plurality of portions, e.g., two, front and rear portions, of the lower portion of the pocket portion 228.

The lower portion of the pocket portion 228 of the trim plate 225 is curved outwardly in the vehicle widthwise direction to integrally form a curved portion 238. A pair of inner and outer engaging pawls 239 and 240 are integrally formed on the lower end portion of the curved portion 238.

The outer engaging pawl 239 in the vehicle widthwise direction extends from the lower end of the curved portion 238 straightly downward to a position where it overlaps the lower open edge of the corresponding engaging hole 237. A taper portion 239a is formed on the lower end portion of the engaging pawl 239. The inner engaging pawl 240 in the vehicle widthwise direction extends from the lower end portion of the curved portion 238 below the lower end of the carrier plate 213. A bent portion 240a which is bent toward the outside of the vehicle is integrally formed on the lower end portion of the engaging pawl 240.

The engaging pawl 239 is inserted in the engaging hole 237 from above. The engaging hole 237 engages from above with the pair of inner and outer engaging pawls 239 and 240. In FIG. 27, an arrow IN indicates an inward direction of the vehicle, and an arrow OUT indicates an outward direction of the vehicle.

In this manner, the automobile door structure of the embodiment shown in FIGS. 25 to 36 is an automobile door structure which is formed by joining the outer panel 201 and inner panel 202 to each other and which includes the vertically movable window glass panel 210. The inner panel 202 includes the inner panel front side portion 202b which forms its front side and is connected to the vehicle body through a hinge, and the inner panel rear side portion 202c which forms the rear side. The resin-made carrier plate 213 can be attached between the inner panel front side portion 202b and inner panel rear side portion 202c. The carrier plate 213 is integrally formed with the belt portion 202e which extends substantially at the height of the belt line between the inner panel front side portion 202b and inner panel rear side portion 202c. The window regulator rail 205 which is disposed closer to the outer panel 201 than the inner panel 202 and allows vertical movement of the window glass panel 210 is built on the carrier plate 213 in advance.

With this arrangement, even when the window regulator rail 205 is built on the carrier plate 213 in advance, since the carrier plate 213 is integrally formed with the belt portion 202e which extends substantially at the height of the belt line between the inner panel front side portion 202b and inner panel rear side portion 202c, when the carrier plate is build on the door, the window regulator rail 205 and the like built on the carrier plate 213 in advance will not interfere with the belt portion 202e of the inner panel 202 at all. Thus, the build-up performance can be improved.

The upper trim portion 215 which faces the vehicle compartment side of the inner panel 202 extends on the upper portion of the carrier plate 213.

With this arrangement, since the upper trim portion 215 is formed to extend on the upper portion of the carrier plate 213, the expensive trim plate 225 can be downsized, and the cost of the entire door can be decreased. In addition, even when the upper trim portion 215 is formed on the upper portion of the carrier plate 213 in this manner, good build-up performance can be ensured by the arrangement of the belt portion 202e.

The belt portion 202e is connected to the carrier plate 213 by welding.

With this arrangement, attaching members such as bolts or nuts that connect the belt portion 202e of the inner panel 202 to the carrier plate 213 become unnecessary, so that the number of components can be decreased.

In addition, the carrier plate 213 is integrally molded with the projection 218 which projects toward the belt portion 202e. The belt portion 202e is connected to one end of the projection 218 by welding.

With this arrangement, when the carrier plate 213 and belt portion 202e are to be connected, they can be connected by a so-called heat caulking means which welds one end of the projection 218 by heating. Thus, connecting performance (efficiency of heat caulking) of the two members (the carrier plate 213 and belt portion 202e) can be improved.

The trim plate 225 having the pocket front surface portion 229 facing the vehicle compartment is attached to that vehicle compartment side of the carrier plate 213 which is below the upper trim portion 215. The pocket rear surface portion 235 is formed on that portion of the carrier plate 213 which opposes the pocket front surface portion 229.

With this arrangement, since the carrier plate 213 can be substituted for the pocket rear surface portion 235, the moldability of the trim plate 225 can be improved when compared to a structure in which the entire front and rear portions of the pocket are formed in the trim plate 225.

The engaging holes 237 with which the lower end of the pocket front surface portion 229 of the trim plate 225 is engaged are formed in the lower portion of the pocket rear surface portion 235. The engaging portions (see the engaging pawls 239 and 240) which are inserted in each engaging hole 237 to engage with its lower hole edge from above are formed on the lower end of the pocket front surface portion 229 of the trim plate 225.

With this arrangement, since the engaging portion (see the engaging pawl 239) is inserted in the corresponding engaging hole 237 to engage with it, a gap in the lower portion of the pocket portion 228 which is formed of the two members (the carrier plate 213 and trim plate 225) can be prevented with a simple structure.

Also, the trim skin 216 is integrally molded on the upper trim portion 215.

With this arrangement, the appearance and design can be improved.

The draining inner member (see the draining inner seal 219) for the window glass panel 210 is integrally formed on the upper portion of the carrier plate 213.

This arrangement can eliminate the additional step of attaching to the upper trim portion 215 a draining inner member (see the draining inner seal 219) which drains water attaching to the window glass panel 210 when the window glass panel 210 is vertically moved. Thus, the productivity can be improved.

As disclosed in this embodiment, when the exposed portion 231 which is not covered by the trim plate 225 is formed on the carrier plate 213 and the embosses 232 (see FIG. 35) are molded on the carrier plate 213 simultaneously, the appearance can be improved. When the exposed portion 231 is formed, the opening 226 can be formed in the trim plate 225, so that the size or weight of the trim plate 225 can be decreased. When the carrier plate 213 is colored, the design can be further improved with arbitrary hue.

Figure 37:
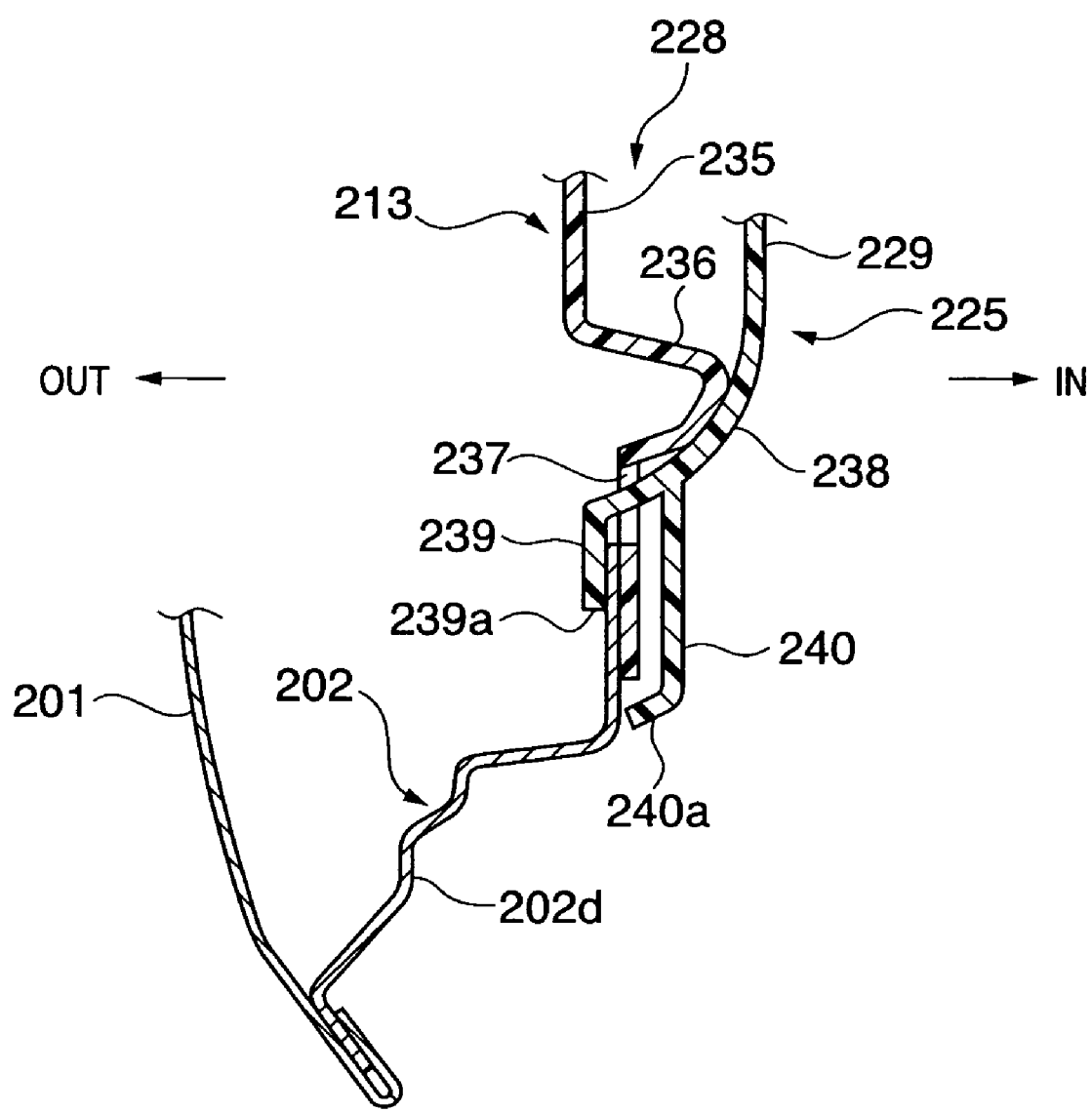
FIG. 37 is a sectional view showing another example of an engaging structure including engaging pawls.
Figure 38:
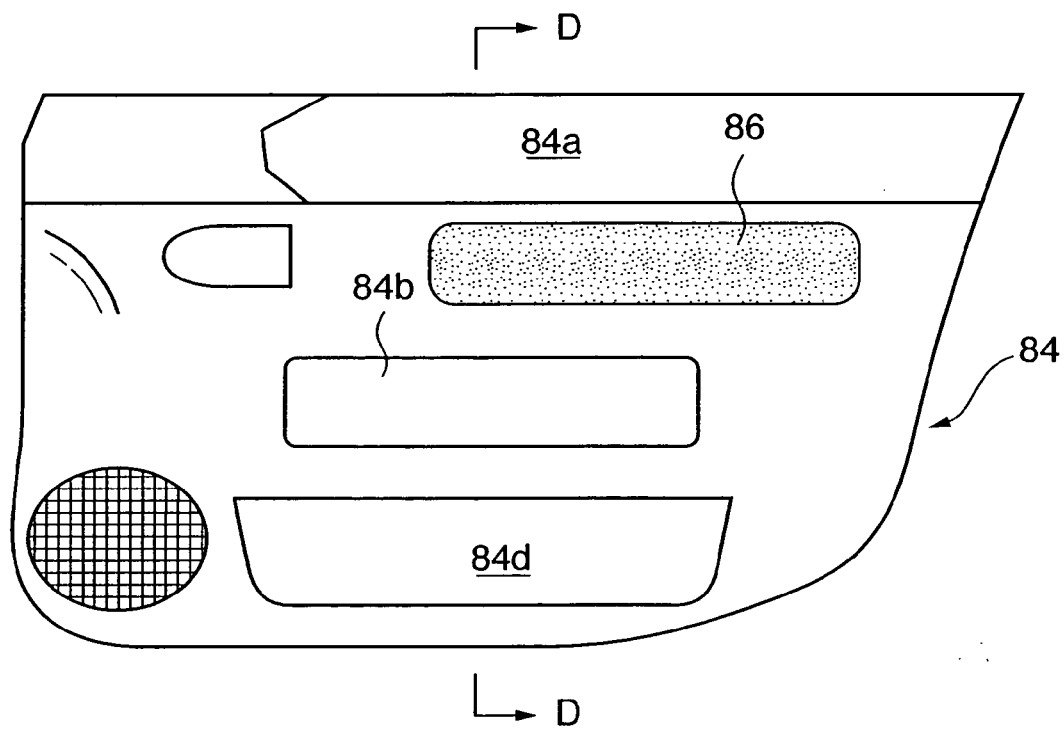
FIG. 38 is a side view showing a conventional trim plate.
Figure 39:
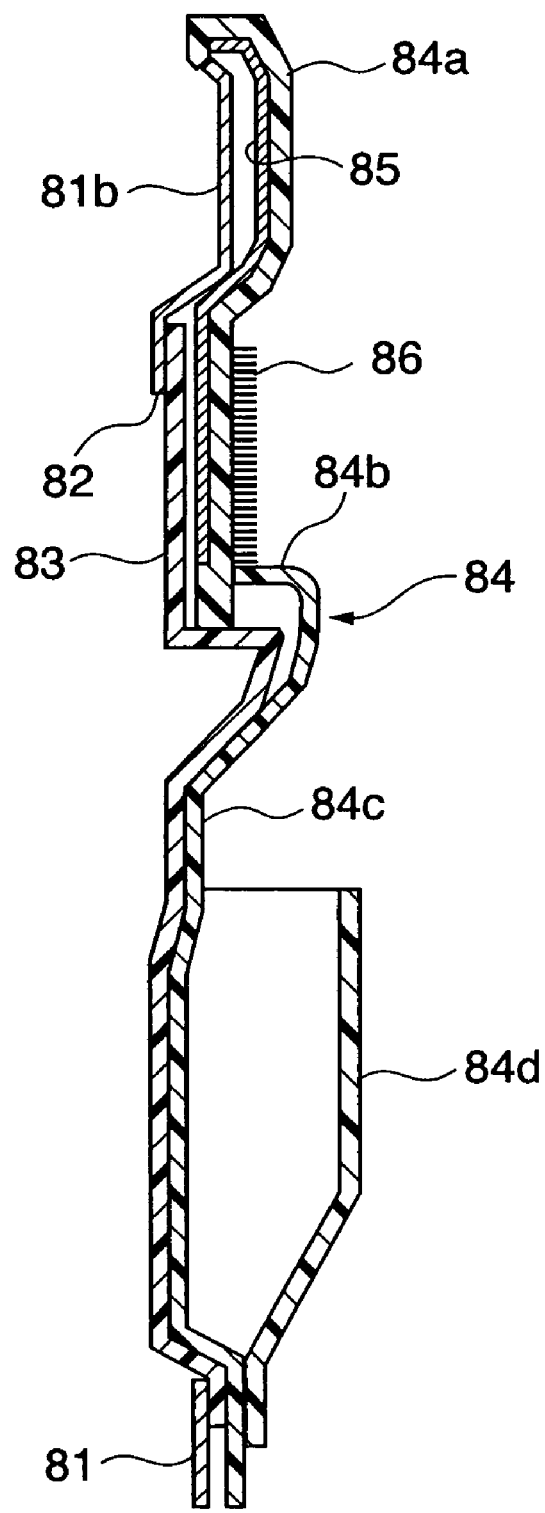
FIG. 39 is a sectional view of an inner panel, carrier plate, and the trim plate taken along the line of arrows D—D of FIG. 38.

FIG. 37 shows another example of the engaging structure including the engaging pawls 239 and 240. In the embodiment shown in FIG. 36, the engaging pawl 239 is secured by only the open edge portion of the engaging hole 237 of the carrier plate 213. In the example shown in FIG. 37, the engaging pawl 239 is secured by both the open edge portion of the engaging hole 237 of the carrier plate 213 and the upper end of the lower side portion 202d of the inner panel 202.

With this arrangement, the support rigidity of the trim plate 225 can be improved. Particularly, the support strength of the trim plate 225 when the door is closed can be improved.

Other arrangements, function, and effect of the example shown in FIG. 37 are the same as those of the embodiment described above. Thus, those portions of FIG. 37 which are identical to those of FIG. 36 are denoted by the same reference numerals, and a detailed description thereof will be omitted.

Having described a plurality of embodiments of the present invention, the present invention is not limited to the arrangements of these embodiments. For example, although the automobile door structure is exemplified by a front door in the above embodiments, it can naturally be applied to a rear door. This arrangement can also be applied to a sash-less front door or rear door.

As many apparently widely different embodiments of the present invention can be made without departing from the spirit and scope thereof, it is to be understood that the invention is not limited to the specific embodiments thereof except as defined in the appended claims.

What is claimed is:

1. An automobile door structure formed by joining an outer panel and an inner panel to each other, wherein
    said inner door panel has an opening portion,
    a resin-made carrier plate which supports accessories of a door is attached to said inner panel so as to cover said opening portion,
    an upper trim portion extending to cover a vehicle compartment side of a belt portion of said inner panel is integrally molded on an upper portion of said carrier plate,
    a trim plate is attached to a portion of said carrier plate which is below said upper trim portion so as to cover the vehicle compartment side of said carrier plate,
    said carrier plate is partly covered by said trim plate to have an exposed portion being left exposed, and
    said exposed portion is molded with embosses simultaneously.

2. The structure according to claim 1, wherein said carrier plate is colored.

3. An automobile door structure formed by joining an outer panel and an inner panel to each other, wherein
    said inner door panel has an opening portion,
    a resin-made carrier plate which supports accessories of a door is attached to said inner panel so as to cover said opening portion,
    an upper trim portion extending to cover a vehicle compartment side of a belt portion of said inner panel is integrally molded on an upper portion of said carrier plate,
    a trim plate is attached to a portion of said carrier plate which is below said upper trim portion so as to cover the vehicle compartment side of said carrier plate,
    said trim plate includes a pocket front surface portion, and a pocket rear surface portion is formed at a corresponding portion of said carrier plate portion which opposes said pocket front surface portion,
    an engaging hole with which said trim plate is engaged is formed in a lower portion of said pocket rear surface portion, and
    an engaging portion which is inserted in the engaging hole to engage with the engaging hole from above is formed on a lower end of said pocket front surface portion of said trim plate.

4. An automobile door structure comprising:
    an outer panel;
    an inner panel joined to the outer panel having an opening portion;
    a one piece member having a resin-made carrier plate portion and an upper trim portion integrally molded on an upper portion of the carrier plate portion, the carrier plate portion supporting accessories of a door and being attached to the inner panel so as to cover the opening portion, and the upper trim portion extending to cover a vehicle compartment side of a belt portion of the inner panel, and a trim plate attached to a portion of the carrier plate below the upper trim portion so as to cover the vehicle compartment side of the carrier plate portion.

5. The structure according to claim 4, wherein a trim skin is molded on said upper portion simultaneously.

6. The structure according to claim 4, wherein a draining inner member for a window glass panel is integrally formed on said upper trim portion.

7. The structure according to claim 4, wherein said trim plate includes a pocket front surface portion, and a pocket rear surface portion is formed at a corresponding portion of said carrier plate portion which opposes said pocket front surface portion.

8. The structure according to claim 7, wherein an engaging hole with which the trim plate is engaged is formed in a lower portion of the pocket rear surface portion, and an engaging portion which is inserted in the engaging hole to engage with the engaging hole from above is formed on a lower end of the pocket front surface portion of the trim plate.

9. The structure according to claim 4, wherein the carrier plate portion is partly covered by the trim plate to have an exposed portion being left exposed, and the exposed portion is molded with embosses simultaneously.

10. The structure according to claim 9, wherein the carrier plate portion is colored.

* * * * *

UNITED STATES PATENT AND TRADEMARK OFFICE
CERTIFICATE OF CORRECTION

| | | |
|---|---|---|
| PATENT NO. | : 7,111,894 B2 | Page 1 of 1 |
| APPLICATION NO. | : 10/852676 | |
| DATED | : September 26, 2006 | |
| INVENTOR(S) | : Fumihiro Kora et al. | |

It is certified that error appears in the above-identified patent and that said Letters Patent is hereby corrected as shown below:

Col. 9, line 15, change "110a" to --101a--

Col. 9, line 17, change "110a" to --101a--

Signed and Sealed this

First Day of May, 2007

JON W. DUDAS
*Director of the United States Patent and Trademark Office*